US010836856B2

(12) United States Patent
Zhou et al.

(10) Patent No.: US 10,836,856 B2
(45) Date of Patent: Nov. 17, 2020

(54) AMINE-IMINO DIALCOHOL NEUTRALIZING AGENTS FOR LOW VOLATILE COMPOUND AQUEOUS ORGANIC COATING COMPOSITIONS AND METHODS FOR USING SAME

(71) Applicants: RHODIA OPERATIONS, Paris (FR); Lichang Zhou, Lawrenceville, NJ (US); Derek Pakenham, Hamilton, NJ (US); Ayaz Khan, Upper Darby, PA (US); Herve Adam, Clarksburg, NJ (US); Jose P. Ruiz, Burlington, NJ (US)

(72) Inventors: Lichang Zhou, Lawrenceville, NJ (US); Derek Pakenham, Hamilton, NJ (US); Ayaz Khan, Upper Darby, PA (US); Hervé Adam, Gujarat (IN); Jose P. Ruiz, Burlington, NJ (US)

(73) Assignee: RHODIA OPERATIONS, Aubervilliers (FR)

( * ) Notice: Subject to any disclaimer, the term of this patent is extended or adjusted under 35 U.S.C. 154(b) by 11 days.

(21) Appl. No.: 15/541,516

(22) PCT Filed: May 20, 2015

(86) PCT No.: PCT/US2015/031786
§ 371 (c)(1),
(2) Date: Jul. 5, 2017

(87) PCT Pub. No.: WO2016/111718
PCT Pub. Date: Jul. 14, 2016

(65) Prior Publication Data
US 2017/0355806 A1 Dec. 14, 2017

Related U.S. Application Data

(60) Provisional application No. 62/099,698, filed on Jan. 5, 2015.

(51) Int. Cl.
| | | |
|---|---|---|
| C08G 18/08 | (2006.01) | |
| C08K 3/00 | (2018.01) | |
| C08K 5/17 | (2006.01) | |
| C09D 133/08 | (2006.01) | |
| C09D 175/04 | (2006.01) | |
| C08K 3/013 | (2018.01) | |
| C09D 5/02 | (2006.01) | |
| C09D 7/45 | (2018.01) | |

(52) U.S. Cl.
CPC ......... *C08G 18/0819* (2013.01); *C08K 3/013* (2018.01); *C08K 5/17* (2013.01); *C09D 5/022* (2013.01); *C09D 5/027* (2013.01); *C09D 7/45* (2018.01); *C09D 133/08* (2013.01); *C09D 175/04* (2013.01)

(58) Field of Classification Search
CPC .............. C08G 18/0819; C09D 133/08; C09D 175/04; C08K 5/17; C08K 3/0033
See application file for complete search history.

(56) References Cited

U.S. PATENT DOCUMENTS

| | | |
|---|---|---|
| 3,269,967 A | 8/1966 | Broadhead |
| 5,114,993 A | 5/1992 | Scherping et al. |
| 5,215,582 A | 6/1993 | Bolt et al. |
| 5,368,640 A | 11/1994 | Pitzer et al. |
| 7,695,557 B2 | 4/2010 | Zhou et al. |
| 8,470,919 B2 | 6/2013 | Robinson |
| 2003/0008079 A1 | 1/2003 | Salter |
| 2003/0082998 A1 | 5/2003 | Carter et al. |
| 2006/0058405 A1 | 3/2006 | Felber et al. |
| 2007/0077865 A1 | 4/2007 | Dysard et al. |
| 2007/0202290 A1 | 8/2007 | Selinfreund |
| 2010/0041801 A1 | 2/2010 | Dowling et al. |
| 2010/0179297 A1 | 7/2010 | Pratt et al. |
| 2010/0324206 A1 | 12/2010 | Richards et al. |
| 2011/0054075 A1 | 3/2011 | Shooter et al. |
| 2013/0316098 A1* | 11/2013 | Lubnin ............... C08F 283/006 428/32.16 |

FOREIGN PATENT DOCUMENTS

| | | |
|---|---|---|
| WO | 02/094956 A1 | 11/2002 |
| WO | 2008/081036 A1 | 7/2008 |

OTHER PUBLICATIONS

G. Pohlein, "Emulsion Polymerization", Encyclopedia of Polymer Science and Engineering, vol. 6, pp. 1-51 (John Wiley & Sons, Inc., NY, NY, 1986).
A.S. Sarac, "Redox polymerization", Progress in Polymer Science 24 (1999), 1149-1204.

(Continued)

*Primary Examiner* — Robert D Harlan
(74) *Attorney, Agent, or Firm* — Jarrod N. Raphael; Jericho B. Pacho

(57) ABSTRACT

Paint, clear coat, stain, adhesive, or other aqueous formulations that contain at least one [(dimethylamino)alkyl]-imino-dialcohol and a alkyd emulsion, polymer latex or polyurethane dispersion binder. Also disclosed are methods for manufacture and use of these formulations. The [(dimethylamino)alkyl]-imino-dialcohols provide aqueous formulations having low odor and reduced volatile organic compounds (VOC). The [(dimethylamino)alkyl]-imino-dialcohols also aid in dispersing pigment and other solids so less co-dispersant is needed for aqueous paint or coating formulations.

9 Claims, 2 Drawing Sheets

(56) References Cited

OTHER PUBLICATIONS

Tramontano, et al, "Synthesis and Coating Properties of Novel Waterborne Polyurethane Dispersions", URL: http://www.wernerblank.com/pdfiles/paper14,pdf, retrieved from the Internet Jul. 2013.
Warson, H. (1977), Emulsion Polymerisation (Theory and Practice).
D. C. Blackley, Applied Science Publishers, Barking, London. 1975, British Polymer Journal, pp. 80-81.

* cited by examiner

AMINE-IMINO DIALCOHOL NEUTRALIZING AGENTS FOR LOW VOLATILE COMPOUND AQUEOUS ORGANIC COATING COMPOSITIONS AND METHODS FOR USING SAME

CROSS-REFERENCE TO RELATED APPLICATIONS

This application claims the benefit of U.S. Provisional Patent Application No. 62/099,698 filed on Jan. 5, 2015, incorporated herein by reference in its entirety.

FIELD OF THE INVENTION

The present invention relates to paint or coating aqueous formulations that contain at least one [(dimethylamino)alkyl]-imino-dialcohol and methods for their use are disclosed. The [(dimethylamino)alkyl]-imino-dialcohols provide aqueous paint or coating formulations having low odor and reduced volatile organic compounds (VOC). The [(dimethylamino)alkyl]-imino-dialcohols also aid in dispersing pigment and other solids so less co-dispersant is needed for aqueous paint or coating formulations.

BACKGROUND OF THE INVENTION

Paints, coatings, sizing, sealants, clearcoats, adhesives and related products are typically produced as uncured and/or fluid mixtures which are sealed and stored for a period of time prior to use. Paint is any liquid, liquefiable, or mastic formulation which, after application to a substrate in a thin layer, is converted to a solid film. It is most commonly used to protect, color, or provide texture to objects. Paint contains a binder (also known as a vehicle or resin), a diluent or solvent (also known as a carrier), a pigment or filler, and may also have other additives. The binder, commonly called the vehicle, is the film-forming component of paint. It is the only component that must be present. Other components, such as those listed below, are optionally included depending on the desired properties of the cured film.

The binder imparts adhesion and strongly influences properties such as gloss, durability, flexibility, and toughness. In latex paint the binder comprises latex. In polyurethane dispersions the binder comprises polyurethane.

Latex paint is a water-borne dispersion of sub-micrometer polymer particles. The term "latex" in the context of paint simply means an aqueous dispersion; latex rubber (the sap of the rubber tree that has historically been called latex) is not an ingredient. The use of latex, produced by emulsion polymerization, in the production of paints or coatings for substrates is well known in the art. Latex paints cure by a process called coalescence where first the water, and then the trace, or coalescing, solvent, evaporate and draw together and soften the binder particles and fuse them together into irreversibly bound networked structures, so the paint will not redissolve in the solvent/water that originally carried it.

Latex paints are used for a variety of applications including interior and exterior, and flat, semi-gloss and gloss applications. Latex polymer binder is a latex polymer which coalesces to form a film. This is a characteristic of paints which distinguishes from, for example, aqueous desktop inkjet printer inks.

Polyurethane dispersions (PUD) are fully reacted high molecular weight polyurethane-polyurea polymers dispersed in water by neutralizing the ionic groups in the prepolymer backbone. The polymer is typically present as small and discrete polymer particles ranging in size from 0.01-5.0 microns in a continuous water phase. They are free of isocyanate residues and have a zero or a very low volatile organic content (VOC). PUDs can be made to have 30-65% solid content and a wide range of film hardness. PUD systems may be formulated as ambient-cured (air dried) or baked coatings for flexible and rigid substrates—such as flooring, fabric, leather, metal, plastics and paper. Additionally, PUD's are graphic art inks, adhesives for shoes and textiles and can be the coats on many products. During the drying of a polyurethane dispersion into a polymer film, the discreet polymer particles must combine to form a continuous film in a process called coalescence. To achieve particle coalescence, the polymer chains should be free to entangle. Typically the glass transition temperature (Tg) of the polyurethane dispersion is the ambient temperature during film formation. In general, polyurethanes have two glass transitions: one at or below room temperature and one greater than 130° C. Due to the low temperature transition, a continuous film can be formed at ambient temperatures. However, to achieve the optimum polyurethane film properties at ambient temperatures, a coalescing solvent may be employed to reduce the higher glass transition and give better chain entanglement in the final film. Typical minimum film forming temperatures for aqueous polyurethane dispersions are in the range of 1-15° C. Polyurethane dispersions and polymer latex are generally film forming at room temperature. Polyurethane dispersions can be blended with acrylic emulsions. Polyurethane dispersions are typically employed in clear coats as well as pigmented coatings.

Alkyd paints have long been in use due to the relatively inexpensive starting materials used in their manufacture and a useful balance of coating properties, including high gloss and good adhesion to substrates. Traditionally, the alkyd resin was manufactured and supplied in solvent, and so these were solvent borne paints. Environmental and safety concerns have resulted in regulatory measures to limit volatile organic compounds (VOC's), which in turn has favored waterborne paints over solvent borne paints. For the most part, waterborne paints from techniques such as emulsion polymerization have proved to be suitable in most end-use applications, although alkyd resins have not been eliminated entirely and techniques have been developed to supply the latter in water as alkyd emulsions, see, for example, U.S. Pat. No. 3,269,967 to Broadhead and U.S. Pat. No. 8,470,919 to Fasano et al.

The main purposes of the diluent, also known as the carrier, are to dissolve the polymer and adjust the viscosity of the paint. It is volatile and does not become part of the paint film. These volatile substances impart their properties temporarily—once the solvent has evaporated, the remaining paint is fixed to the surface. This component is optional: some paints have no diluent. Water is the main diluent for water-borne paints. Solvent-borne, also called oil-based, paints can have various combinations of organic solvents as the diluent, including aliphatics, aromatics, alcohols, ketones and white spirit. Sometimes volatile low-molecular weight synthetic resins also serve as diluents.

Pigments are granular solids incorporated in the paint to contribute color. Fillers are granular solids incorporate to impart toughness, texture, give the paint special properties, or to reduce the cost of the paint. Alternatively, some paints contain dyes instead of or in combination with pigments.

Besides the three main categories of ingredients, paint can have a wide variety of miscellaneous additives, usually added in small amounts.

Paints and inks are two different categories of products. For example, desktop inkjet printers, as used in offices or at home, tend to use aqueous inks based on a mixture of water, glycol and dyes or pigments. Some desktop inks contain sulfonated polyazo black dye (commonly used for dying leather), nitrates and other compounds. Aqueous inks are mainly used in printers with thermal inkjet heads, as these heads require water to perform. While aqueous inks often provide the broadest color gamut and most vivid color, most are not waterproof without specialized coating or lamination after printing. Most dye-based inks, while usually the least expensive, are subject to rapid fading when exposed to light. Pigment-based aqueous inks are typically more costly but provide better long-term durability and ultraviolet resistance. Inks marketed as "Archival Quality" are usually pigment-based.

Organic amines are used in aqueous based paints as neutralizing agents. A number of alkanolamines have been mentioned in published waterborne coating formulations. In particular, 2-amino-2-methyl-1-propanol, monoethanolamine, triethanolamine and many related alkanolamines have been employed. Neutralizing agents are present in many waterborne coatings, such as latex paint, to bring the pH up to an optimal value between 8 and 10, typically about 8.5 to 9.3.

However, in many geographies paint manufacturers are facing regulations to reduce the volatile organic content (VOC) of their formulations. Most conventional neutralizing amines are 100% volatile and are therefore VOC contributors. In addition, when used in an otherwise low VOC paint formulation, the odor of such amines is more noticeable.

Ammonia and inorganic hydroxides are potential alternatives for use as neutralizers and by definition non-VOC contributors. However, ammonia, while an efficient neutralizer, has a very strong odor and is therefore unsuitable for use in low odor paint. Inorganic hydroxides, such as potassium hydroxide, are undesirable because they often result in coatings with poor scrub resistance.

Accordingly, efficient neutralizing agents, which both exhibit low or no VOC and have very low or no amine odor, would be a significant advance for the paints and coatings industry.

US Patent Application Publication No. 2010/0324206 to Richards et al and US 2011/0054075 to Shooter disclose non-aqueous compositions containing a particulate solid, an organic medium, and a polyurethane dispersant having laterally attached pendant groups with tertiary amine group(s), an essentially linear backbone, and laterally attached solvent-solubilizing side chains of a polyester or polyether (Richards and Shooter), or polyacrylate (Shooter) including mixtures of such side chains. One of the species which when incorporated into the polyurethane through reaction with isocyanates provides laterally attached pendant groups with tertiary amine group(s) is 1, 1'-[[3-(dimethylamino)-propyl]imino]bis-2-propanol.

US 2007/0077865 to Dysard et al discloses a polishing system employing abrasive in a carrier comprising polyethylene oxide/polypropylene oxide copolymer and water. The carrier optionally includes amines, also the carrier optionally includes polyacrylate. It does not disclose polymer latex or polyurethane dispersions or alkyd emulsion.

US 2003/0082998 to Carter discloses a polishing system comprising a liquid carrier, an alkali metal ion, a compound comprising an amine group, and a polishing moiety (abrasive). Optionally the carrier includes a surfactant, for example, urethane polymers, or acrylates. It does not disclose alkyd emulsions, polymer latex or polyurethane dispersion.

SUMMARY OF THE INVENTION

In one aspect, the invention is an aqueous coating formulation which has a pH of 7 to 11, typically 7.5 to 11, more typically 8 to 9.5, and which comprises at least one binder selected from at least one member of the group consisting of a polymer latex, a polyurethane dispersion, and an alkyd emulsion, at least one pigment, water and at least one [(dimethylamino)alkyl]-imino-dialcohol as a neutralizing agent to reduce the volatile organic compound (VOC) content thereof.

In another aspect, the at least one [(dimethylamino)alkyl]-imino-dialcohol is also a dispersant in the aqueous coating formulation.

More particularly the present invention provides an aqueous dispersion or coating formulation comprising:
(a) 20 to 95% by weight at least one resin binder selected from at least one member of the group consisting of a polymer latex, a polyurethane dispersion, and an alkyd emulsion (preferably wherein the lower limit is 25, 30 or 35 wt. %; and the upper limit is preferably 85 or 80%), wherein 30 to 80 wt. % of the resin binder is resin solids, and 70 to 20 wt. % water (preferably the upper limit for the water is 65 or 60 wt. %, and the lower limit is preferably 30 or 40 wt. %),
(b) up to 60% by weight, typically 0.1 to 60% by weight, more typically 5 to 40% by weight, or 5 to 20% by weight, of a pigment;
optionally, if the binder comprises the polyurethane dispersion, the binder further comprises cross-linker, preferably selected from at least one of melamine or aziridine;
(c) 0.01 to 5% by weight of a [(dimethylamino)alkyl]-imino-dialcohol neutralizing agent having the formula I:

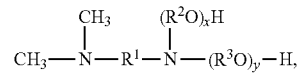

wherein
$R^1$ is independently C2-C6 alkyl;
$R^2$ is $-(C_mH_{2m})$, wherein each m is independently selected from an integer from 2 to 4, x is 1 to 10;
$R^3$ is $-(C_nH_{2n})$, wherein each n is independently selected from an integer from is 2 to 4, y is 1 to 10;
wherein all weight percents are based on the total weight of the aqueous coating formulation,
wherein the formulation has a pH of 7 to 11, preferably 7.5 to 11, more preferably 8 to 9.5.

Preferably the at least one resin binder is a polymer latex or an aqueous polyurethane dispersion.

The invention also provides a method to make an aqueous dispersion or coating formulation, comprising mixing different components which include
(a) 20 to 95% by weight at least one resin binder selected from at least one member of the group consisting of a polymer latex, a polyurethane dispersion, and an alkyd emulsion (preferably wherein the lower limit is 25, 30 or 35 wt. %; and the upper limit is preferably 85 or 80%), wherein 30 to 80 wt. % of the resin binder is resin solids, and 70 to 20 wt. % water (preferably the upper limit for the water is 65 or 60 wt. %, and the lower limit is preferably 30 or 40 wt. %), (b) up to 60% by weight, typically 0.1 to 60% by weight, more typically 5 to 40% by weight, or 5 to 20% by weight, of a pigment;

optionally, if the binder comprises the polyurethane dispersion, the binder further comprises cross-linker, preferably selected from at least one of melamine or aziridine;

(c) 0.01 to 5% by weight of at least one [(dimethylamino)alkyl]-imino-dialcohol neutralizing agent having the formula I:

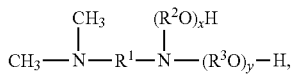

wherein
$R^1$ is independently C2-C6 alkyl;
$R^2$ is —$(C_mH_{2m})$, wherein each m is independently selected from an integer from 2 to 4, x is 1 to 10;
$R^3$ is —$(C_nH_{2n})$, wherein each n is independently selected from an integer from is 2 to 4, y is 1 to 10;
said neutralizing agent being added in such an amount that the formulation has a pH of 7 to 11, typically 7.5 to 11, more typically 8 to 9.5.

Typically the binder is a polymer latex or a polyurethane dispersion.

The at least one [(dimethylamino)alkyl]-imino-dialcohol can be employed as a post manufacture additive. Thus, it would be added to an already made aqueous dispersion or coating, for example, paint or adhesive, formulations. Preferably the neutralizing agent is added to a paint comprising the binder and pigment, and the binder comprises a polymer latex, a polyurethane dispersion, or an alkyd emulsion.

Another use for the at least one [(dimethylamino)alkyl]-imino-dialcohol is to add it as a neutralizer during manufacture of aqueous dispersion, for example an aqueous polyurethane dispersion, or manufacture of a coating, for example, paint or adhesive, formulations.

For example, the invention provides a method for making a polyurethane dispersion comprising neutralizing (also known as salting) acid-functional polyurethane in the presence of water with a neutralizing agent of formula I:

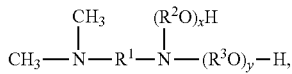

wherein
$R^1$ is independently C2-C6 alkyl;
$R^2$ is —$(C_mH_{2m})$, wherein each m is independently selected from an integer from 2 to 4, x is 1 to 10;
$R^3$ is —$(C_nH_{2n})$, wherein each n is independently selected from an integer from is 2 to 4, y is 1 to 10;
said neutralizing agent being added in such an amount that the dispersion has a pH of 7 to 11, typically 7.5 to 11, more typically 8 to 9.5.

In another aspect, this invention provides a method of reducing the volatile organic compound (VOC) content of a latex paint or a latex clear coat formulation obtained by mixing different components which include:

(a) 20 to 95% by weight at least one resin binder comprising a polymer latex (preferably wherein the lower limit is 25, 30 or 35 wt. %; and the upper limit is preferably 85 or 80%), wherein 30 to 80 wt. % of the resin binder is resin solids, and 70 to 20 wt. % water (preferably the upper limit for the water is 65 or 60 wt. %, and the lower limit is preferably 30 or 40 wt. %), (b) up to 60% by weight, 0.1 to 60% by weight, more typically 5 to 40% by weight, or 5 to 20% by weight, of a pigment;

(c) 0.01 to 5% by weight of at least one [(dimethylamino)alkyl]-imino-dialcohol neutralizing agent having the formula I:

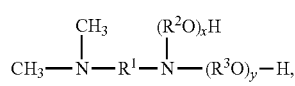

wherein
$R^1$ is independently C2-C6 alkyl;
$R^2$ is —$(C_mH_{2m})$, wherein each m is independently selected from an integer from 2 to 4, x is 1 to 10;
$R^3$ is —$(C_nH_{2n})$, wherein each n is independently selected from an integer from is 2 to 4, y is 1 to 10;
said neutralizing agent being added in such an amount that the formulation has a pH of 7 to 11, preferably 7.5 to 11, more preferably 8 to 9.5.

The invention also provides a method for applying a coating to an article, comprising:

I) providing a substrate;

II) applying an aqueous coating composition comprising (a) 20 to 95% by weight at least one resin binder selected from at least one member of the group consisting of a polymer latex, a polyurethane dispersion, and an alkyd emulsion (preferably wherein the lower limit is 25, 30 or 35 wt. %; and the upper limit is preferably 85 or 80%), wherein 30 to 80 wt. % of the resin binder is resin solids, and 70 to 20 wt. % water (preferably the upper limit for the water is 65 or 60 wt. %, and the lower limit is preferably 30 or 40 wt. %), (b) up to 60% by weight, 0.1 to 60% by weight, more typically 5 to 40% by weight, or 5 to 20% by weight, of a pigment;

(c) 0.01 to 5% by weight of at least one [(dimethylamino)alkyl]-imino-dialcohol neutralizing agent having the formula I:

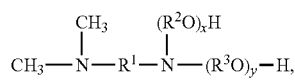

wherein
$R^1$ is independently C2-C6 alkyl;
$R^2$ is —$(C_mH_{2m})$, wherein each m is independently selected from an integer from 2 to 4, x is 1 to 10;
$R^3$ is —$(C_nH_{2n})$, wherein each n is independently selected from an integer from is 2 to 4, y is 1 to 10; and
said neutralizing agent being present in such an amount that the aqueous coating composition has a pH of 7 to 11, typically 7.5 to 11, more typically 8 to 9.5; and III) adhering said aqueous coating composition to said substrate;

IV) drying the aqueous coating composition to remove the water and form a solid coating on the substrate, preferably the coating is at least 10 microns thick.

The formulations of the present invention can be used as components of other formulations such as paints, pigmented coatings, clear coats, inks, stains, and adhesives, typically containing polymer latex, polyurethane dispersions, or alkyd emulsion for interior and exterior applications (especially paints).

Conventional coating application methods may be used to apply the composition of this invention such as, for example, brushing, rolling, mopping, and spraying methods such as, for example, air-atomized spray, air-assisted spray, airless spray, high volume low pressure spray, and air-assisted airless spray, and electrostatic spray. Additionally, for some systems, other application techniques may be used to apply the composition, such as, caulk gun, roll coaters, and curtain coaters. The aqueous coating composition may be advantageously applied to substrates such as, for example, plastic, wood, metal, primed surfaces, previously painted surfaces, primed surfaces, undercoated surfaces, worn surfaces, weathered painted surfaces, glass, paper, paperboard, leather, composites, ceramics, plaster, stone, concrete, and cementitious substrates; roofing substrates such as asphaltic coatings, roofing felts, foamed polyurethane insulation. Drying is typically allowed to proceed under ambient conditions such as, for example, at 0° C. to 35° C. but may be accelerated with higher temperatures, air flow, low humidity, actinic energy such as, for example, e-beam, UV, visible, infrared, or microwave radiation, or sonic energy.

These and other features and advantages of the present invention will become more readily apparent to those skilled in the art upon consideration of the following detailed description, which describe both the preferred and alternative embodiments of the present invention.

DETAILED DESCRIPTION OF THE PREFERRED EMBODIMENTS

Figure 1:
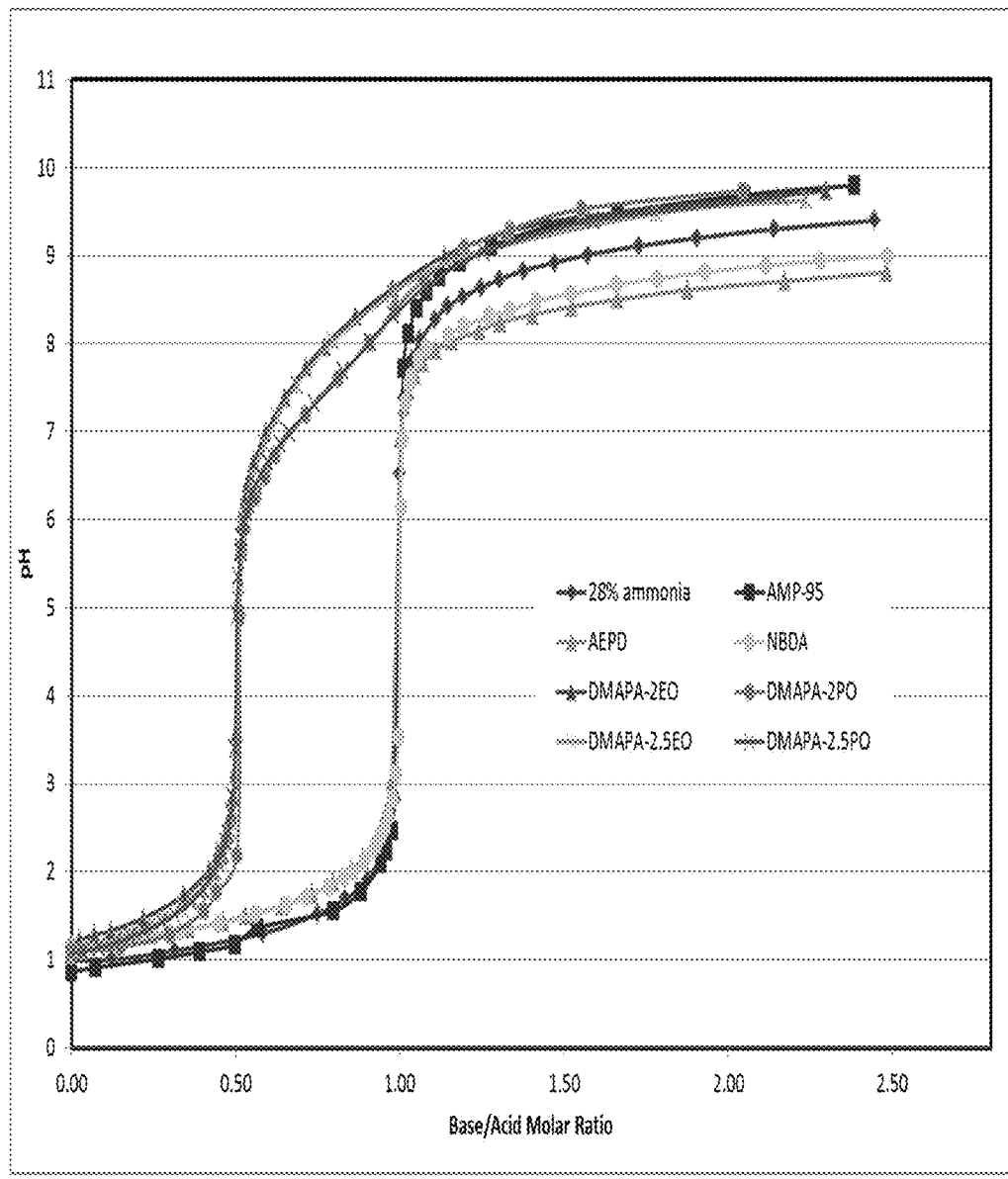
FIG. 1 shows titration curves and neutralizing power comparing
28% ammonia,
Comparative Example 1 containing AMP-95,
Comparative Example 2 containing VOX-1000 brand of AEPD,
Comparative Example 3 containing VANTEX-T brand of NBDA,
Example 1 of the present invention containing DMAPA-2EO;
1,1'-[[3-(Dimethylamino)propyl]-imino]bispropan-2-ol (DMAPA-2PO);
DMAPA-2.5EO; and
DMAPA-2.5PO.

As used herein, the term "alkyl" means a monovalent straight or branched saturated hydrocarbon radical, more typically, a monovalent straight or branched saturated ($C_1$-$C_{40}$) hydrocarbon radical, such as, for example, methyl, ethyl, n-propyl, isopropyl, n-butyl, isobutyl, tert-butyl, hexyl, octyl, hexadecyl, octadecyl, eicosyl, behenyl, tricontyl, and tertacontyl.

As used herein, the term "alkoxyl" means an oxy radical that is substituted with an alkyl group, such as for example, methoxyl, ethoxyl, propoxyl, isopropoxyl, or butoxyl, which may optionally be further substituted on one or more of the carbon atoms of the radical.

As used herein, for statements directed to "acrylics" or "styrene-acrylics", etc. as a class of polymers, it is understood to include polymers with methacrylic acid and/or methacrylate monomers as well as acrylic acid and/or acrylate monomers.

As used herein, unless otherwise indicated, the term "emulsion polymer" refers to a polymer made by emulsion polymerization.

The term "alkyd emulsion" refers to a dispersion of an alkyd in water regardless of the technique used to manufacture the alkyd polymer, such as, for example, solution polymerization in solvent.

As used herein, the term "alkoxyalkyl" means an alkyl radical that is substituted with one or more alkoxy substituents, more typically a ($C_1$-$C_{22}$)alkyloxy-($C_1$-$C_6$)alkyl radical, such as methoxymethyl, and ethoxybutyl.

As used herein, the term "alkenyl" means an unsaturated straight or branched hydrocarbon radical, more typically an unsaturated straight, branched, ($C_2$-$C_{22}$) hydrocarbon radical, that contains one or more carbon-carbon double bonds, such as, for example, ethenyl, n-propenyl, iso-propenyl.

As used herein, terms "aqueous medium" and "aqueous media" are used herein to refer to any liquid medium of which water is a major component. Thus, the term includes water per se as well as aqueous solutions and dispersions.

As used herein, the term "aryl" means a monovalent unsaturated hydrocarbon radical containing one or more six-membered carbon rings in which the unsaturation may be represented by three conjugated double bonds, which may be substituted one or more of carbons of the ring with hydroxy, alkyl, alkoxyl, alkenyl, halo, haloalkyl, monocyclic aryl, or amino, such as, for example, phenyl, methylphenyl, methoxyphenyl, dimethylphenyl, trimethylphenyl, chlorophenyl, trichloromethylphenyl, triisobutyl phenyl, tristyrylphenyl, and aminophenyl.

As used herein, the term "aralkyl" means an alkyl group substituted with one or more aryl groups, more typically a ($C_1$-$C_{18}$)alkyl substituted with one or more ($C_6$-$C_{14}$)aryl substituents, such as, for example, phenylmethyl, phenylethyl, and triphenylmethyl.

As used herein, the term "aryloxy" means an oxy radical substituted with an aryl group, such as for example, phenyloxy, methylphenyl oxy, isopropylmethylphenyloxy.

As used herein, the term "dry basis" means water-free and "wet basis" means including water.

The term "biopolymer" includes polysaccharides, for example dextran, proteins and polyesters and combinations thereof.

As used herein, the terminology "($C_x$-$C_y$)" in reference to an organic group, wherein x and y are each integers, indicates the group may contain from x carbon atoms to y carbon atoms per group.

As used herein, the term "cycloalkenyl" means an unsaturated hydrocarbon radical, typically an unsaturated ($C_5$-$C_{22}$) hydrocarbon radical, that contains one or more cyclic alkenyl rings and which may optionally be substituted on one or more carbon atoms of the ring with one or two ($C_1$-$C_6$) alkyl groups per carbon atom, such as cyclohexenyl, cycloheptenyl, and "bicycloalkenyl" means a cycloalkenyl ring system that comprises two condensed rings, such as bicycloheptenyl.

As used herein, the term "cycloalkyl" means a saturated hydrocarbon radical, more typically a saturated ($C_5$-$C_{22}$) hydrocarbon radical, that includes one or more cyclic alkyl rings, which may optionally be substituted on one or more carbon atoms of the ring with one or two ($C_1$-$C_6$)alkyl groups per carbon atom, such as, for example, cyclopentyl, cycloheptyl, cyclooctyl, and "bicyloalkyl" means a cycloalkyl ring system that comprises two condensed rings, such as bicycloheptyl.

As used herein, an indication that a formulation is "free" of a specific material means the formulation contains no measurable amount of that material.

As used herein, the term "heterocyclic" means a saturated or unsaturated organic radical that comprises a ring or condensed ring system, typically comprising from 4 to 16 ring atoms per ring or ring system, wherein such ring atoms comprise carbon atoms and at least one heteroatom, such as for example, O, N, S, or P per ring or ring system, which may optionally be substituted on one or more of the ring atoms, such as, for example, thiophenyl, benzothiphenyl, thianthrenyl, pyranyl, benzofuranyl, xanthenyl, pyrolidinyl, pyrrolyl, pyradinyl, pyrazinyl, pyrimadinyl, pyridazinyl, indolyl, quinonyl, carbazolyl, phenathrolinyl, thiazolyl, oxazolyl, phenoxazinyl, or phosphabenzenyl.

As used herein, the term "hydroxyalkyl" means an alkyl radical, more typically a ($C_1$-$C_{22}$)alkyl radical, that is substituted with one or more hydroxyl groups, such as for example, hydroxymethyl, hydroxyethyl, hydroxypropyl, and hydroxydecyl.

As used herein the term "(meth)acrylate" refers collectively and alternatively to the acrylate and methacrylate and the term "(meth)acrylamide" refers collectively and alternatively to the acrylamide and methacrylamide, so that, for example, "butyl (meth)acrylate" means butyl acrylate and/or butyl methacrylate.

As used herein, "molecular weight" in reference to a polymer or any portion thereof, means to the weight-average molecular weight ("$M_w$") of said polymer or portion, wherein $M_w$ of a polymer is a value measured by gel permeation chromatography with an aqueous eluent or an organic eluent (for example dimethylacetamide, dimethylformamide, and the like), depending on the formulation of the polymer, light scattering (DLS or alternatively MALLS), viscometry, or a number of other standard techniques and $M_w$ of a portion of a polymer is a value calculated according to known techniques from the amounts of monomers, polymers, initiators and/or transfer agents used to make the said portion.

As used herein, unless otherwise indicated, percentages are in weight percent.

As used herein, the indication a radical may be "optionally substituted" or "optionally further substituted" means, in general, unless further limited, either explicitly or by the context of such reference, such radical may be substituted with one or more inorganic or organic substituent groups, such as, for example, alkyl, alkenyl, aryl, aralkyl, alkaryl, a hetero atom, or heterocyclyl, or with one or more functional groups capable of coordinating to metal ions, such as hydroxyl, carbonyl, carboxyl, amino, imino, amido, phosphonic acid, sulphonic acid, or arsenate, or inorganic and organic esters thereof, such as, for example, sulphate or phosphate, or salts thereof.

As used herein, an indication a formulation is "substantially free" of a specific material, means the formulation contains no more than an insubstantial amount of that material, and an "insubstantial amount" means an amount that does not measurably affect the desired properties of the formulation.

As used herein, the term "surfactant" means a compound that reduces surface tension when dissolved in water.

"Anti-microbial effective amount" means the amount of antimicrobial ingredient, that as a whole, provides an antimicrobial (including, for example, biocide, mildewcide, antiviral, antibacterial, or antifungal) activity that reduces, prevents, or eliminates one or more species of microbes, such that an acceptable level of the microbe results.

"Surfactant effective amount" means the amount of the surfactant that provides a surfactant effect to enhance the stability of emulsions of the polymers.

The term "architectural coating" as used herein is intended to encompass a mixture of resin, optionally pigment, and a suitable liquid vehicle that is reasonably fluid and provides a thin and adherent layer when applied to a substrate. As such, the term "architectural coating" is intended to encompass paints, lacquers, varnishes, base coats, clear coats, primers and the like.

Paints that dry by solvent evaporation and contain a solid binder dissolved in a solvent are known as lacquers. A solid film forms when the solvent evaporates, and because the film can re-dissolve in solvent, lacquers are unsuitable for applications where chemical resistance is important.

Latex paint is a water-borne dispersion of sub-micrometre polymer particles. The term "latex" in the context of paint simply means an aqueous dispersion; latex rubber (the sap of the rubber tree historically called latex) is not an ingredient. These dispersions are prepared by emulsion polymerization. Latex paints cure by a process called coalescence where first the water, and then the trace, or coalescing, solvent, evaporate and draw together and soften the latex binder particles and fuse them together into irreversibly bound networked structures, so the paint will not redissolve in the solvent/water that originally carried it. The residual surfactants in paint as well as hydrolytic effects with some polymers cause the paint to remain susceptible to softening and, over time, degradation by water.

Unless the context indicates otherwise, in the specification and claims, the terms pigment, binder, co-solvent, biocide, surfactant, additive, and similar terms also include mixtures of such materials.

Unless otherwise indicated, ratios, percentages, parts, average molecular weights, and the like used herein are by weight.

Aqueous coating formulations, for example, latex paint formulations or polyurethane dispersion paint formulations are complex multi-component formulations used for the decorative and/or functional finishing of residential and industrial surfaces. The formulation and manufacture of latex paint formulations is well known to those skilled in the art. Generally, aqueous coating formulations contain one or more binders, a liquid carrier, and one or more additives. Generally, latex paint formulations contain one or more pigments, one or more binders, a liquid carrier, and one or more additives. Additives include, for example, neutralizing agents, leveling agents and surfactants, rheology modifiers, co-solvents, corrosion inhibitors, and biocides, as well as other below-listed additives.

The present invention relates to compositions and methods of use of a particular family of [(dimethylamino)alkyl]-imino-dialcohol as a neutralizing agent and/or dispersant for aqueous dispersions and coatings.

The aqueous film forming compositions can be any type which benefits from coalescing agents, especially compositions where low VOC is an advantage or necessary and/or efficiency is an advantage. The coatings of the present invention are suitable for use in a variety of architectural and industrial applications, including but not limited to automotive and aerospace paints (e.g., clear coatings, basecoats, or undercoats, floor covering coatings, wall coatings, transportation coatings, maintenance coatings, and the like) or any other application where a low VOC coating composition is desired for use on a substrate. Typically the compositions are aqueous dispersions and coatings employed as paints, for example latex paints, coatings, binders, sealants, adhesives, water-based architectural coatings, consumer and industrial paints, alkyd paints, and aqueous polyurethane dispersions.

The aqueous coating composition is a stable fluid that can be applied to a wide variety of materials such as, for example, paper, wood, concrete, metal, glass, ceramics, plastics, plaster, and roofing substrates such as asphaltic coatings, roofing felts, foamed polyurethane insulation; or to previously painted, primed, undercoated, worn, or weathered substrates. The aqueous coating composition of the invention can be applied to the materials by a variety of techniques well known in the art such as, for example, brush, rollers, mops, air-assisted or airless spray, electrostatic spray, and the like.

In its composition respects the present invention provides an aqueous dispersion or coating formulation comprising:
(a) 20 to 95% by weight at least one resin binder selected from at least one member of the group consisting of a polymer latex, a polyurethane dispersion, and an alkyd emulsion (preferably wherein the lower limit is 25, 30 or 35 wt. %; and the upper limit is preferably 85 or 80%), wherein 30 to 80 wt. % of the resin binder is resin solids, and 70 to 20 wt. % water (preferably the upper limit for the water is 65 or 60 wt. %, and the lower limit is preferably 30 or 40 wt. %),
(b) up to 60% by weight, typically 0.1 to 60% by weight, more typically 5 to 40% by weight, or 5 to 20% by weight, of a pigment;
optionally, if the binder comprises the polyurethane dispersion, the binder further comprises cross-linker, preferably selected from at least one of melamine or aziridine;
(c) 0.01 to 5% by weight of at least one [(dimethylamino) alkyl]-imino-dialcohol neutralizing agent having the formula I:

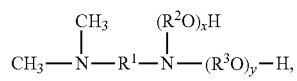

I wherein
$R^1$ is independently C2-C6 alkyl;
$R^2$ is $-(C_mH_{2m})$, wherein each m is independently selected from an integer from 2 to 4, x is 1 to 10;
$R^3$ is $-(C_nH_{2n})$, wherein each n is independently selected from an integer from is 2 to 4, y is 1 to 10,
y is 1 to 10;
wherein all weight percents are based on the total weight of the aqueous coating formulation, wherein the formulation has a pH of 7 to 11, typically 7.5 to 11, more typically 8 to 9.5.

The polymer latex, polyurethane dispersion, and alkyd emulsion aqueous coating formulations of the invention preferably have a VOC level less than about 100 g/L, more preferably less than or equal to about 50 g/L, and still more preferably less than or equal to about 10 g/L.

The formulations contain a carrier in which the formulation ingredients are dissolved, dispersed, and/or suspended. In the aqueous based formulations of the invention, the carrier is usually water, although other water-based solutions such as water-alcohol mixtures and the like may be used. The aqueous carrier generally makes up the balance of the formulation, after all the other ingredients have been accounted for.

The amount of the binder in the formulations of the invention can be the amount conventionally used in paint and coating formulations. This can vary widely due to the desired gloss/sheen range, and also the solids concentration, of a specific paint formulation.

The total solids content of the aqueous coating formulation is typically at least 5 wt % of the total formulation, for example about 5%-80%, more preferably, about 20%-70% by weight of the total formulation. By way of non-limiting example the amount of binder solids can be from about 5% to about 25% by volume of the total formulation or about 5% to about 25% by weight of the total formulation.

Typically the total water content of the aqueous coating formulation of the present invention is 20-95% by weight water, more typically 25-90% by weight water, still more typically 30-80% by weight water.

Water of the aqueous carrier of the aqueous coating formulation is a solvent. The aqueous coating formulation may also have solvents other than water. It is desired to minimize the amount of non-aqueous solvents. More than 75 wt. % of the solvent of the aqueous coating formulation is water. Typically the aqueous coating formulation contains less than 5 wt. %, preferably less than 0.5 wt. %, and more preferably 0 wt. % non-aqueous solvent.

Other additives may be included in the paint and coating formulations besides the neutralizing agents, pigments, binders, and carriers. These include, but are not limited to, leveling agents and surfactants, thickeners, rheology modifiers, co-solvents such as glycols, including propylene glycol or ethylene glycol, corrosion inhibitors, co-dispersants, additional neutralizing agents, defoamers, emulsifiers, wet-edge additives, wetting agents, humectants, wax, colorants, UV absorbers, freeze-thaw stabilizers, biocides, anti-oxidants, volatile plasticizers and the like, or a combination thereof.

Paint and Clearcoat Manufacturing

In an embodiment, the present invention includes a method of preparing an aqueous coating composition by mixing different components which include
(a) 20 to 95% by weight at least one resin binder selected from at least one member of the group consisting of a polymer latex, a polyurethane dispersion, and an alkyd emulsion (preferably wherein the lower limit is 25, 30 or 35 wt. %; and the upper limit is preferably 85 or 80%), wherein 30 to 80 wt. % of the resin binder is resin solids, and 70 to 20 wt. % water (preferably the upper limit for the water is 65 or 60 wt. %, and the lower limit is preferably 30 or 40 wt. %),
(b) up to 60% by weight, typically 0.1 to 60% by weight, more typically 5 to 40% by weight, or 5 to 20% by weight, of a pigment;
optionally, if the binder comprises the polyurethane dispersion, the binder further comprises cross-linker, preferably selected from at least one of melamine or aziridine;

(c) 0.01 to 5% by weight of at least one [(dimethylamino)alkyl]-imino-dialcohol neutralizing agent having the formula I:

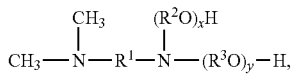

wherein
$R^1$ is independently C2-C6 alkyl;
$R^2$ is $—(C_mH_{2m})$, wherein each m is independently selected from an integer from 2 to 4, x is 1 to 10;
$R^3$ is $—(C_nH_{2n})$, wherein each n is independently selected from an integer from is 2 to 4, y is 1 to 10;
said neutralizing agent being added in such an amount that the formulation has a pH of 7 to 11.

In an embodiment the invention provides a method of reducing the volatile organic compound (VOC) content of a latex paint formulation obtained by mixing different components which include:
(a) 20 to 95% by weight at least one resin binder comprising a polymer latex (preferably wherein the lower limit is 25, 30 or 35 wt. %; and the upper limit is preferably 85 or 80%), wherein 30 to 80 wt. % of the resin binder is resin solids, and 70 to 20 wt. % water (preferably the upper limit for the water is 65 or 60 wt. %, and the lower limit is preferably 30 or 40 wt. %),
(b) up to 60% by weight, 0.1 to 60% by weight, more typically 5 to 40% by weight, or 5 to 20% by weight, of a pigment;
(c) 0.01 to 5% by weight of at least one [(dimethylamino)alkyl]-imino-dialcohol neutralizing agent having the formula I:

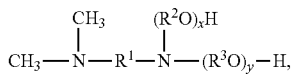

wherein
$R^1$ is independently C2-C6 alkyl;
$R^2$ is $—(C_mH_{2m})$, wherein each m is independently selected from an integer from 2 to 4, x is 1 to 10;
$R^3$ is $—(C_nH_{2n})$, wherein each n is independently selected from an integer from is 2 to 4, y is 1 to 10;
said neutralizing agent being added in such an amount that the formulation has a pH of 7 to 11, preferably 7.5 to 11, more preferably 8 to 9.5.

The latex, polyurethane and/or alkyd paint and clearcoat formulations of the invention may be manufactured by conventional manufacturing techniques, which are well known to those skilled in the art.

Typically, the paint formulations are manufactured by a two-step process. First, a dispersion phase, commonly referred to as the grind phase, is prepared by mixing the dry pigments with other grind phase components, including most other solid powder formulation materials, under constant high shear agitation to provide a high viscosity and high solids mixture. This part of the process is designed to effectively wet and dis-agglomerate the dry pigments and stabilize them in an aqueous dispersion.

The second step of the paint manufacturing process is commonly referred to as the letdown or thin down phase, because the viscous grind is diluted with the remaining formulation components, which are generally less viscous than the grind mix. Typically, the binders, any pre-dispersed pigments, and any other paint materials that only require mixing and perhaps moderate shear, are incorporated during the letdown phase. The letdown phase may be done either by sequentially adding the letdown components into a vessel containing the grind mix, or by adding the grind mix into a vessel containing a premix of the binder resins and other letdown components, followed by sequential addition of the final letdown components. In either case, constant agitation is needed, although application of high shear is not required. The neutralizing agent compounds of the invention are typically added to the formulation at one or more of three different places in the manufacturing process: to the pigment dispersion, to the binder dispersion, and/or in a final addition to the paint formulation. The amount used is determined based on the desired pH of the formulation. Typically, an amount of the compound is added to provide a final pH in the range of about 7 to 11, typically about 7.5 to 11, more typically 8 to 9.5.

Conventional additives can be added in any suitable order to the polymer latex, polyurethane dispersion, or alkyd emulsion, the pigment, or combinations thereof, to provide these additives in the aqueous coating formulation. The polymer latex, polyurethane dispersion, or alkyd emulsion is preferably film-forming at temperatures about 25° C. or less, either inherently or through the use of plasticizers. Typical binders are polymer latex or polyurethane dispersion.

Adhesive formulations of the invention may be made by conventional manufacturing techniques. Typical adhesives include a latex adhesive polymer which has bonding ability. The adhesive is protected to a certain degree by being between two substrates. Thus, it does not need some of the performance properties of a coating. For some uses it has enough bond strength to fracture or tear at least one of the substrates. For other uses where a removable bond is desired there is less bond strength to at least one of the bonded surfaces. The coating has a coalescing agent to form a continuous film. Adhesives form films at room temperature without a coalescing aid. Soft flexible polymer film is desired for an adhesive, and this film is generally thermoplastic. The film can subsequently be cross-linked through functional groups if heat and solvent resistance are desired.

Latex adhesives, such as acrylic based adhesives, are used in three main areas: heat-sealable adhesives, laminating adhesives, and pressure-sensitive adhesives.

Heat sealing is used for bonding two substrates where one or both are impervious to water. Laminating adhesives function similar to heat-seal adhesives except the temperature to activate the adhesive is lower. The pressure sensitive adhesive is protected by a release liner until it is ready to use. When the application is desired the liner is removed and the adhesive-coated substrate is bonded to the other substrate using pressure alone.

A pressure sensitive adhesive will have high tack or adhesive strength combined with high cohesive strength. Solvent based polystyrene acrylics (PSAs) or their emulsion counterparts may be employed for all three categories of adhesive. Water based acrylic pressure sensitive adhesives are typically composed from adhesive polymers synthesized from vinyl acrylic monomers. A variety of monomers are used to achieve desired performance properties such as tack, peel, and shear. A common method for categorizing the monomers is based on the glass transition temperature ($T_g$) of their homopolymers. This approach divides monomers into the categories of soft, medium, hard, and functional. Soft monomers produce homopolymers with $T_g$s below about −30° C., for hard monomers it is above 30° C., and medium monomers product homopolymers with $T_g$s between these values. A typical pressure sensitive adhesive used in labels is composed primarily of soft monomer. Examples of soft monomers are n-butyl acrylate and 2-ethylhexyl acrylate. Examples of medium monomers are ethyl acrylate and butyl acrylate. Examples of hard monomers are methyl methacrylate, styrene, and vinyl acetate. Examples of functional monomers are methacrylic acid and acrylic acid. In its coating ready form, the acrylic polymer of a pressure sensitive adhesive formulation compose the colloidal particles of a latex dispersion. Normally, adhesive films are generated by coating the latex on the release liner and then removing the water via drying. This destabilized the colloid and coalesces the polymer particles. The resulting film backed by release liner, is then pressed onto a face stock to produce label stock. This is known as transfer coating. The handling of the water based acrylic pressure sensitive adhesive as a hydrophobic colloidal distinguishes it from other pressure sensitive adhesives such as hot melt and solvent-based technology.

Acrylic polymers are also used to formulate waterborne inks. In addition to the pigment, waterborne acrylic inks are usually composed of two types of acrylic polymer, an emulsion-polymerized acrylic and an alkali-soluble solid acrylic resin. The emulsion acrylic contributes to finished ink properties such as film formation, adhesion to plastic films, and scuff, heat, and alkali resistance. The alkali-soluble resins are good pigment wetters, display good rheology, and prevent drying of the ink in the cylinders when the line is stopped during printing runs. Many different types of alkali-soluble resins can be used in combination with the emulsion acrylics.

Neutralizing agent, at least a portion of which is one or more [(dimethylamino)alkyl]-imino-dialcohols, is included in aqueous formulations of the present invention to bring the pH of the formulation to an optimal value of 7 to 11, typically 7.5 to 11, more typically 8 to 9.5. For example, the neutralizing agent may be added to a paint formulation in at least three different places in the manufacturing process: to the pigment dispersion, to the resin dispersion, and/or in a final addition to the paint formulation.

The [(dimethylamino)alkyl]-imino-dialcohol has the formula I:

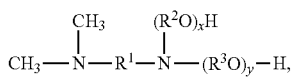

wherein
$R^1$ is independently C2-C6 alkyl;
$R^2$ is $-(C_mH_{2m})$, wherein each m is independently selected from an integer from 2 to 4, x is 1 to 10;
$R^3$ is $-(C_nH_{2n})$, wherein each n is independently selected from an integer from 2 to 4, y is 1 to 10.

In formula I, for both composition and method aspects of the present invention, R2 can be EO, PO or Butylene Oxide or a mixture of any or all of EO, PO and BO, the PO or Butylene Oxide may be branched or straight chain. In the case of the mixture it does not matter which of EO, PO or Butylene Oxide is first (attached to the N atom). Preferably in formula I R2 can be EO or PO or a mixture of EO and PO, the PO may be branched or straight chain. In the case of the mixture it does not matter which of EO or PO is first (attached to the N atom).

Likewise in formula I R3 can be EO, PO or Butylene Oxide or a mixture of any or all of EO, PO and BO, the PO or Butylene Oxide may be branched or straight chain. In the case of the mixture it does not matter which of EO, PO or Butylene Oxide is first (attached to the N atom). Preferably in formula I R3 can be EO or PO or a mixture of EO and PO, the PO may be branched or straight chain. In the case of the mixture it does not matter which of EO or PO is first (attached to the N atom).

Preferably for the [(dimethylamino)alkyl]-imino-dialcohol compound of Formula I,
R1 is independently C2-C3 alkyl;
R2 is $-(C_mH_{2m})$, wherein each m is independently selected from an integer from 2 to 3, x is 1 to 5;
R3 is $-(C_nH_{2n})$, wherein each n is independently selected from an integer from 2 to 3, y is 1 to 5.

More preferably the [(dimethylamino)alkyl]-imino-dialcohol compound has the formula II:

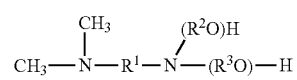

wherein R1 is independently C2-C3 alkyl;
R2 is $-(C_mH_{2m})$, wherein each m is independently selected from an integer from 2 to 3, x is 1 to 5;
R3 is $-(C_nH_{2n})$, wherein each n is independently selected from an integer from 2 to 3, y is 1 to 5, and
m and n are independently 2 to 3.

Most preferably the [(dimethylamino)alkyl]-imino-dialcohol compound comprises 1,1'-[[3-(Dimethylamino)propyl]-imino]bispropan-2-ol having the formula III.

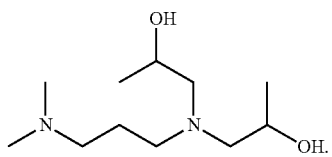

Also, most preferably in the aqueous coating formulation the [(dimethylamino)alkyl]-imino-dialcohol compound comprises 2,2'-[[3-(dimethylamino)propyl]-imino]bisethanol having the formula IV:

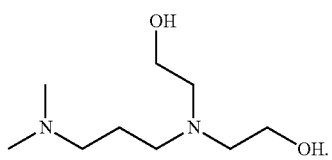

Such neutralizing agents have low odor, excellent assistance to pigment dispersion, excellent assistance to water resistance, excellent corrosion inhibition, and excellent leveling characteristics. Latex paints containing such neutralizing agents tested lower in volatile organic compounds (VOC) than those that contained currently commercialized neutralizing agents like AMP, monoethanolamine and methylaminoethanol.

The neutralizing agents of the present invention provide superior pigment dispersion. This is an advantage for flat paint formulations that have higher Pigment Volume Concentrations (PVC's), typically 30% to 80%.

The [(dimethylamino)alkyl]-imino-dialcohol neutralizing agents of the present invention may be synthesized by charging dimethylaminoalkylamine, for example, dimethylaminopropylamine, to a pressurized vessel containing a nitrogen rich atmosphere. Then the vessel is heated, e.g., to 110-160° C., and ethylene oxide or propylene oxide is added slowly under agitation. The mixture is then stirred until pressure stabilizes. Then the vessel is cooled, e.g. to 60-90° C., released pressure and purged with nitrogen. After the reaction is completed the vessel is cooled, e.g., to 2-40° C., and discharged. In a separate vessel, under nitrogen atmosphere, the material just made is distilled at vacuum pressure to result in the [(dimethylamino)alkyl]-imino-dialcohol, for example 1,1'-[[3-(Dimethylamino)propyl]-imino]bispropan-2-ol (DMAPA-2PO) or 1,1'-[[3-(Dimethylamino)propyl]-imino]bispropan-2-ol with 2.5 PO (DMAPA-2.5PO).

In addition to the [(dimethylamino)alkyl]-imino-dialcohols, optional secondary neutralizing agents may be employed. In embodiments comprising the amine-imino dialcohol neutralizing agent of the present invention alone or with a secondary neutralizing agent, at least 10 wt, %, preferably at least 50 wt. %, more preferably more than 50 wt. %, of the total weight of the neutralizing agents is the amine-imino dialcohol neutralizing agent. However, preferably the neutralizing agent is only at least one [(dimethylamino)alkyl]-imino-dialcohol with an absence of other neutralizing agents, in particular an absence of other nitrogen-containing neutralizing agents, alkali metal hydroxide, or ammonium hydroxide.

Typical optional secondary neutralizing agents are one or more of ammonia and low molecular weight aliphatic amines, or 2-Amino-2-methyl-1-propanol (AMP), or N-alkyldiethanolamines, and N-alkyldipropanolamines having alkyl groups of from 4 to 8 carbon atoms, for example N-butyldiethanolamine, an alkali metal hydroxide and/or ammonium hydroxide.

The binder provides the durable and flexible matrix within which the pigments are dispersed and suspended. It binds the pigment particles together and provides integrity and adhesion for the paint film or clearcoat film.

Many types of resins are known and used in the aqueous carrier of aqueous coating formulations. The binders for use in aqueous coating formulations and methods of the present invention are typically latex polymer or polyurethane dispersed in water.

Polymer latex, also known as latex, is a stable dispersion (emulsion) of polymer microparticles in an aqueous medium. Synthetic latexes may be can be made by polymerizing a monomer that has been emulsified with surfactants.

The latex film forming compositions may be of any type that benefit from neutralizing agents. The latex polymers are typically produced by free radical initiated aqueous emulsion polymerization of a monomer mixture. Emulsion polymerization is discussed in G. Pohlein, "Emulsion Polymerization", Encyclopedia of Polymer Science and Engineering, vol. 6, pp. 1-51 (John Wiley & Sons, Inc., NY, NY, 1986), the disclosure of which is incorporated herein by reference. Emulsion polymerization is a heterogeneous reaction process in which unsaturated monomers or monomer solutions are dispersed in a continuous phase with the aid of an emulsifier system and polymerized with free-radical or redox initiators. The product, a colloidal dispersion of the polymer or polymer solution, is called a latex.

A typical monomer mixture contains at least one acrylic monomer selected from the group consisting of acrylic acid, acrylic acid esters (methyl acrylate, ethyl acrylate, butyl acrylate and/or 2-ethylhexylacrylate), methacrylic acid, and methacrylic acid esters. The monomers can also include one or more monomers selected from the group consisting of vinyl alcohol, vinyl chloride, ethylene, acrylonitrile, methacrylonitrile, ureido methacrylate, vinyl acetate, vinyl esters of branched tertiary monocarboxylic acids, itaconic acid, crotonic acid, maleic acid, fumaric acid, and mono- and diethylenically unsaturated hydrocarbons, such as ethylene, isobutylene, styrene, (alpha)-methyl styrene, and aliphatic dienes, such as butadiene, isoprene, and chloroprene. For example, it is possible to include C4-C8 conjugated dienes such as 1,3-butadiene, isoprene or chloroprene. Commonly used monomers in making acrylic paints are butyl acrylate, methyl methacrylate, ethyl acrylate and the like. Preferably, the monomers include one or more monomers selected from the group consisting of n-butyl acrylate, methyl methacrylate, styrene, and 2-ethylhexyl acrylate.

The latex polymer main monomers are typically selected from the group consisting of pure acrylics (comprising acrylic acid, methacrylic acid, acrylic acid esters and methacrylic acid esters of an alcohol, such as methyl acrylate, ethyl acrylate, butyl acrylate, 2-ethylhexyl acrylate, methyl methacrylate, ethyl methacrylate and butyl methacrylate, for example, a typical pure acrylic is a butyl acrylate/methyl methacrylate copolymer derived from monomers including butyl acrylate and methyl methacrylate); styrene acrylics (comprising styrene and acrylic acid, methacrylic acid, an acrylate ester, and/or a methacrylate ester as the main monomers); vinyl acrylics (comprising acrylic acid and vinyl esters of an aliphatic acid, such as vinyl acetate, methacrylic acid, an acrylate ester, and/or a methacrylate ester as the main monomers); and acrylated ethylene vinyl acetate copolymers (comprising ethylene, vinyl acetate and acrylic acid, methacrylic acid, an acrylate ester, and/or a methacrylate ester as the main monomers). The monomers can also include other main monomers such as acrylamide and acrylonitrile, and one or more functional monomers such as itaconic acid and ureido methacrylate, as would be readily understood by those skilled in the art.

In typical acrylic paint compositions the polymer is comprised of one or more esters of acrylic or methacrylic acid, typically a mixture, e.g. about 50/50 by weight, of a high $T_g$ monomer (e.g. methyl methacrylate) and a low $T_g$ monomer (e.g. butyl acrylate), with small proportions, e.g. about 0.5% to about 2% by weight, of acrylic or methacrylic acid. The vinyl-acrylic paints usually include vinyl acetate and butyl acrylate and/or 2-ethyl hexyl acrylate and/or vinyl versatate. In vinyl-acrylic paint compositions, at least 50% of the polymer formed is comprised of vinyl acetate, with the remainder being selected from the esters of acrylic or methacrylic acid. The styrene/acrylic polymers are typically similar to the acrylic polymers, with styrene substituted for all or a portion of the methacrylate monomer thereof.

Other common latex binders include poly(vinyl acetate) and copolymers of vinyl acetate with one or more of the following monomers; vinyl chloride, vinylidene chloride, styrene, vinyltoluene, acrylonitrile, methacrylonitrile, one or two of the acrylic and methacrylic acid esters mentioned above. Similarly, copolymers of one or more of the acrylic or methacrylic acid esters with one or more of the following monomers: vinyl acetate, vinyl chloride, vinylidene chloride, styrene, vinyltoluene, acrylonitrile, and methacrylonitrile are also more or less conventionally employed in aqueous coating formulations. Homopolymers of ethylene, isobutylene, and styrene, and copolymers of one or more of these hydrocarbons with one or more esters, nitriles or amides of acylic acid or of methacrylic acid or with vinyl esters, such as vinyl acetate and vinyl chloride, or with vinylidene chloride are also used. The diene polymers are generally used in aqueous coating formulations in the form of copolymers with one or more monomers following: styrene, vinyltoluene, acrylonitrile, methacrylonitrile, esters of acrylic acid or methacrylonitrile, and esters of methacrylic acid. RHOPLEX SG30 synthetic latex emulsion resin is a typical binder for latex paint.

Suitable initiators, reducing agents, catalysts, and surfactants for emulsion polymerization are well known in the art.

Typical initiators include ammonium persulfate (APS), hydrogen peroxide, sodium, potassium or ammonium peroxydisulfate, dibenzoyl peroxide, lauryl peroxide, ditertiary butyl peroxide, 2,2'-azobisisobutyronitrile, t-butyl hydroperoxide, benzoyl peroxide, and the like. Commonly used redox initiation systems are described e.g., by A. S. Sarac in Progress in Polymer Science 24(1999), 1149-1204.

Suitable reducing agents are those which increase the rate of polymerization and include for example, sodium bisulfite, sodium hydrosulfite, sodium formaldehyde sulfoxylate, ascorbic acid, isoascorbic acid, and mixtures thereof.

Suitable catalysts are those compounds which increase the rate of polymerization and which, in combination with the above-described reducing agents, promote decomposition of the polymerization initiator under the reaction conditions. Suitable catalysts include transition metal compounds such as, for example, ferrous sulfate heptahydrate, ferrous chloride, cupric sulfate, cupric chloride, cobalt acetate, cobaltous sulfate, and mixtures thereof.

Emulsion polymerization occurs in the presence of an emulsifier. Typically the mixture contains 0.5 to 6 wt % emulsifier based on weight of latex monomers. Typical emulsifiers are ionic or non-ionic surfactants that are polymerizable or non-polymerizable in the aqueous coating composition including latex polymer. Suitable ionic and non-ionic surfactants are alkyl polyglycol ethers such as ethoxylation products of lauryl, tridecyl, oleyl, and stearyl alcohols; alkyl phenol polyglycol ethers such as ethoxylation products of octyl- or nonylphenol, diisopropyl phenol, triisopropyl phenol; alkali metal or ammonium salts of alkyl, aryl or alkylaryl sulfonates, sulfates, phosphates, and the like, including sodium lauryl sulfate, sodium octylphenol glycolether sulfate, sodium dodecylbenzene sulfonate, sodium lauryldiglycol sulfate, and ammonium tritertiarybutyl phenol and penta- and octa-glycol sulfonates, sulfosuccinate salts such as disodium ethoxylated nonylphenol half ester of sulfosuccinic acid, disodium n-octyldecyl sulfosuccinate, sodium dioctyl sulfosuccinate, and the like.

In the resulting latex dispersions the polymer preferably exists as a generally spherical particle, dispersed in water. The latex polymer dispersion preferably includes from about 30 to about 75% solids and a mean latex particle size of from about 70 to about 650 nm. The latex polymer is preferably present in the aqueous coating composition in an amount from about 5 to about 60 percent by weight, and more preferably from about 8 to about 40 percent by weight (i.e. the weight percentage of the dry latex polymer based on the total weight of the coating composition).

In one embodiment, the binder is a polyurethane dispersion.

The neutralizing agent of formula I:

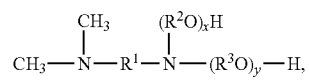

wherein
R1 is independently C2-C6 alkyl;
R2 is —($C_mH_{2m}$)—, wherein each m is independently selected from an integer from 2 to 4, x is 1 to 10;
R3 is —($C_nH_{2n}$)—, wherein each n is independently selected from an integer from is 2 to 4, y is 1 to 10;
may be used as a neutralizing agent for polyurethane dispersions regardless of their source. The neutralizing agent being added in such an amount that the formulation has a pH of 7 to 11, preferably 7.5 to 11, more preferably 8 to 9.5. The [(dimethylamino)alkyl]-imino-dialcohol neutralizing agent of the present invention may be employed alone or in combination with a secondary neutralizing agent, before, during or after dispersion of the aqueous polyurethane dispersion or prepolymer in water. Typical secondary neutralizing agents are an alkali, such as sodium or potassium, or a base, such as an amine.

In an embodiment, the present invention employs at least one [(dimethylamino)alkyl]-imino-dialcohol during manufacture of the polyurethane dispersion or as a post manufacture neutralizer additive to the polyurethane dispersion.

Aqueous polyurethane dispersions are high molecular weight, typically linear polyurethanes or ureas dispersed in water. "Aqueous polyurethane dispersion" as used herein encompasses both emulsions of polyurethane polymers and stable mixtures of self-dispersing polyurethane polymers. Typical emulsions of polyurethane polymers include a preformed polyurethane polymer emulsified into an aqueous medium with the addition of surfactants and application of shear. Polyurethane dispersions of self-dispersing polyurethane polymers are well known in the art and many are commercially available. These polyurethane dispersions are generally free of external surfactants because chemical moieties having surfactant like characteristics have been incorporated into the polyurethane polymer to make the dispersion "self-emulsifying" or "self-dispersing". Representative examples of internal emulsifier moieties that can be incorporated into the polyurethane dispersions useful in the present invention include ionic groups such as sulfonates, carboxylates, and quaternary amines; as well as nonionic emulsifier groups such as polyethers.

The term "polyurethane" as used herein refers to a thermoplastic polymer which can be made crosslinkable (or thermosettable) and is produced by the reaction of a polyisocyanate (an organic compound containing at least two isocyanate (—N═C═O) groups per molecule) and a polyol (a glycol compound containing at least two hydroxyl (—OH) groups per molecule). The polymeric reaction product contains repeating carbamate ester linkages (or urethane linkages) of the structure X:

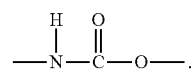

A polymer having these linkages is classified as a polyurethane herein.

Typical isocyanate is selected from well-known materials such as the mono-, di-, tri- and multi-functional isocyanates.

Suitable polyisocyanates include, without limitation, aliphatic linear and cyclic polyisocyanates, preferably having up to 18 carbon atoms, and substituted and unsubstituted aromatic polyisocyanates. Illustrative examples include, without limitation, ethylene diisocyanate, 1,2-diisocyanatopropane, 1,3-diisocyanatopropane, 1,4-butylene diisocyanate, lysine diisocyanate, 1,4-methylene bis(cyclohexyl isocyanate), isophorone diisocyanate, toluene diisocyanates (e.g., 2,4-toluene diisocyanate and 2,6-toluene diisocyanate) diphenylmethane 4,4'-diisocyanate, methylenebis-4,4'-isocyan-atocyclohexane, 1,6-hexamethylene diisocyanate, p-phenylene diisocyanate, tetramethyl xylene diisocyanate, meta-xylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, and combinations of two or more of these. Biurets, allophonates, isocyanurates, carbodiimides, and other such modifications of these isocyanates can also be used as the polyisocyanates. In a preferred embodiment, the polyisocyanates include methylene-bis-4, 4'-isocyanatocyclohexane, 1,6-hexamethylene diisocyanate, 1,12-dodecamethylene diisocyanate, and combinations thereof.

Typical polyol is selected from the group consisting of:
1) polyols such as the saturated and unsaturated polyhydric alcohols including ethylene glycol, propylene glycol, neopentyl glycol, 1,4-butanediol, 1,4-butenediol, 1,6-hexanediol, furan dimethanol, and cyclohexane dimethanol;
2) polyester polyols formed from the reaction of saturated and unsaturated polyhydric alcohols such as ethylene glycol, propylene glycol, neopentyl glycol, 1,4-butanediol, 1,4-butenediol, 1,6-hexanediol, furan dimethanol, and cyclohexane dimethanol, with saturated and unsaturated polycarboxylic acids and derivatives thereof such as maleic acid, fumaric acid, itaconic acid, succinic acid, glutaric acid, adipic acid, isophthalic acid, terephthalic acid, phthalic anhydride, dimethyl terephthalate, dimer acids and the like;
3) polyesters formed by the reaction of lactones, such as caprolactone, with a polyol;
4) polyether polyols such as the products of the polymerization of a cyclic oxide such as ethylene oxide, propylene oxide or tetrahydrofuran;
5) polyether polyols formed by the addition of one or more cyclic oxides to water, ethylene glycol, propylene glycol, diethylene glycol, cyclohexane dimethanol, glycerol, or Bisphenol A;
6) polycarbonate polyols such as the reaction product of 1,3-propanediol, 1,4-butanediol, 1,6-hexanediol, diethylene glycol or tetraethylene glycol with diaryl carbonates such as diphenyl carbonate or phosgene;
7) polyacetal polyols such as the reaction product of a glycol such as diethylene glycol, triethylene glycol or hexanediol with formaldehyde;
8) polyols such as dihydroxyalkanoic acids including dimethylolpropionic acid; and mixtures thereof, with an isocyanate composition.

Optionally, and generally present during the reaction is up to about 0.06%, preferably between about 0.01% and about 0.04% (by weight based upon total solids of polyol and isocyanate) of a catalyst such as di-butyl tin dilaurate, tin octoate and the like.

To ensure the intermediate polymer is dispersible in an aqueous media, generally a percentage of the total polymer weight solids, preferably between about 1% and about 10%, is contributed by polyols (or other compositions having active hydrogen atoms or the ability to react with isocyanates, such as amines or mercaptans) having the ability to contribute ionic or hydrophilic groups to the polyurethane-urea. Examples of these ingredients are polyols, amines or mercaptans containing carboxylic acid groups, sulfonic acid groups, phosphoric acid groups, ammonium salts, phosphonium salts or sulfonium salts.

The present invention provides a method for making a polyurethane dispersion comprising neutralizing acid-functional polyurethane in the presence of water with a neutralizing agent of formula I:

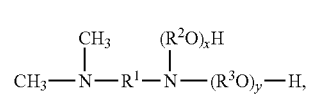

wherein
R1 is independently C2-C6 alkyl;
R2 is —($C_mH_{2m}$), wherein each m is independently selected from an integer from 2 to 4, x is 1 to 10;
R3 is —($C_nH_{2n}$), wherein each n is independently selected from an integer from is 2 to 4, y is 1 to 10;
said neutralizing agent being added in such an amount that the dispersion has a pH of 7 to 11, preferably 7.5 to 11, more preferably 8 to 9.5.

Suitable polyurethane polymers can be prepared by any of the known methods. Most conventional polyurethane dispersions are high molecular weight ionic polymers commonly prepared by one of two methods. In a first method the polyurethane is polymerized in solvent then dispersed in water. In this method for preparing polyurethane polymers, the polyisocyanate component is reacted with an excess of equivalents of the polyol component to form a hydroxyl-functional polyurethane polymer. In a second method, an isocyanate terminated pre-polymer is prepared in the melt or in an aprotic solvent, and then chain extended with a diamine in the water phase in the presence of a neutralizing amine. Triethylamine (TEA) has traditionally been used as a neutralizing amine due to its high basicity and high volatility at ambient temperature. Tramontano, et al, Synthesis and Coating Properties of Novel Waterborne Polyurethane Dispersions, URL: <http://www.wernerblank.com/pd-files/paper14.pdf>, retrieved from the Internet July 2013. However, the present invention may employ an amine-imino dialcohol neutralizing agent of the present invention alone as neutralizing amine or in combination with a secondary neutralizing agent such as TEA during this chain extension.

In the first method, typically the polyol is charged with the catalyst to a reaction vessel, and the contents are heated to a temperature of between about 70° C. and about 100° C., with continuous or stepwise addition of the isocyanate-functional materials over a period of time, preferably between about ½ to about 4 hours.

After complete addition of the isocyanate materials, a reaction vessel temperature is generally maintained between about 80° C. and 100° C. until the residual isocyanate percentage (based upon the total solids weight of the polymer) is below about 8.0%, preferably between about 1.5% to about 6.0%. This typically takes about 2 to 4 hours. Residual isocyanate percentage can be measured by any means well known in the art.

The contents are then generally cooled to below about 70° C. and the ionic groups present in the product of the above reaction are then neutralized by the addition of the amine-imino dialcohol neutralizing agent of the present invention alone or with a secondary neutralizing agent. Typical secondary neutralizing agents are triethylamine, trimethylamine, triisopropyl amine, tributyl amine, N,N-dimethyl-cyclohexyl amine, N,N-dimethylstearyl amine, N,N-dimethyl aniline, N-methylmorpholine, N-ethylmorpholine, N-methylpiperazine, N-methylpyrolidine, N-methylpiperidine, N,N-dimethyl-ethanol amine, N,N-diethyl-ethanol amine, triethanol amine, N-methyldiethanol amine, dimethylaminopropanol, 2-methoxyethyldimethyl amine, N-hydroxyethylpiperazine, 2-(2-dimethylaminoethoxy)-ethanol and 5-diethylamino-2-pentanone and mixtures thereof.

In the second method, an excess of equivalents of the polyisocyanate component can be reacted with the polyol component to form an isocyanate-functional prepolymer. The prepolymer can then be reacted further in different ways. First, the prepolymer can be reacted with a monofunctional alcohol or amine to provide a non-functional polyurethane polymer. Examples of mono-functional alcohols and amines include polyethylene oxide compounds having one terminal hydroxyl group, lower mono-functional alcohols having up to 12 carbon atoms, amino alcohols such as dimethylethanolamine, and secondary amines such as diethylamine and dimethylamine. Second, the prepolymer can be reacted with a polyfunctional polyol, polyamine, or amino alcohol compound to provide reactive hydrogen functionality. Examples of such polyfunctional compounds include, without limitation, the polyols mentioned above, including triols such as trimethylolpropane; polyamines such as ethylenediamine, butylamine, and propylamine; and amino alcohols, such as diethanolamine. Finally, the prepolymer can be chain extended in the water during emulsification or dispersion of the prepolymer in the aqueous medium. A di-functional amine compound such as ethylene diamine, propylene diamine, butylene diamine, hexamethylene diamine, cyclohexylene diamine, piperazine, hydrazine, mixtures thereof, equivalents thereof and the like in an amount sufficient to react with up to about 90% of the theoretical amount of residual isocyanate functionality can optionally be included in the dispersing media for chain extension of the polyurethane. Chain extenders having a functionality greater than two should not be included in any appreciable amount due to their tendency to cause unacceptably high levels of branching. The prepolymer is mixed with water after or during neutralization.

The percentage of solids in the water dispersion can typically range up to about 60% by weight, preferably between about 20 to 50% by weight.

Acid-functional polyurethanes that can be neutralized (salted) to form anionic dispersions or emulsions may be synthesized by including a monomer having acid functionality. Typical monomers having acid functionality are dialkylpropionic acids such as dimethylolpropionic acid, and alkali metal salts of amino acids such as taurine, methyl taurine, 6-amino caproic acid, glycine, sulfanilic acid, diamino benzoic acid, ornithine, lysine and 1:1 adducts of sultones, such as propane sultone or butane sultone, with diamines, such as ethylene diamine, hydrazine, or 1,6-hexamethylene diamine. The hydroxyl groups react to form the urethane linkages while the acid group remains unreacted in the polyurethane polymerization as pendant acid groups.

The pendant acid groups are partially or fully salted (neutralized) with an amine-imino dialcohol neutralizing agent of the present invention alone or in combination with a secondary neutralizing agent before, during, or after dispersion of the aqueous polyurethane dispersion or prepolymer in water. Typical secondary neutralizing agents are an alkali, such as sodium or potassium, or with a base, such as an amine (for example, any of the amine secondary neutralizing agents listed above).

The present invention may add the at least one [(dimethylamino)alkyl]-imino-dialcohol neutralizing agent of the present invention to an aqueous polyurethane dispersion made by the alternative method regardless of whether [(dimethylamino)alkyl]-imino-dialcohol neutralizing agent was employed during a chain extending step of polyurethane manufacture.

In some embodiments, the waterborne coating compositions of the present invention comprising aqueous polyurethane dispersions are free of acrylic resins. In some embodiments, the waterborne coating compositions of the present invention comprising aqueous polyurethane dispersion are also free of polyesters.

In embodiments comprising the amine-imino dialcohol neutralizing agent of the present invention alone or with a secondary neutralizing agent, at least 10 wt, %, preferably at least 50 wt. %, of the total weight of the neutralizing agents is the amine-imino dialcohol neutralizing agent of the present invention.

The neutralizing agent can be added in excess, that is, an amount greater than necessary to neutralize the ionic groups; however, too much neutralizing will cause an unacceptable increase in the VOC of the composition. At a minimum, the amount of neutralizing agent added should be sufficient to neutralize at least about 80% of the ionic groups present in solution. Preferably, the neutralizing agent is added in an amount sufficient to theoretically neutralize 100% of the ionic groups.

A typical aqueous polyurethane dispersion includes an acid number of from 5 to 25 mg KOH/g. The weight average molecular weight of the polyurethane is typically from about 5,000 to about 60,000, preferably from about 10,000 to about 40,000 g/mol, and more preferably from about 15,000 to about 30,000 g/mol.

Modified polyether polyurethanes such as polyetherester polyurethanes and polyethercarbonate polyurethanes may also be suitable polyurethanes for the preparation of aqueous polyurethane dispersions. These modified polyether polyurethanes can be derived by incorporating additional polyester polyols or polycarbonate polyols into polyether polyols during the polyurethane manufacturing.

Typically the polyurethane polymer useful to prepare the polyurethane dispersion is selected from polyether polyurethanes, polyester polyurethanes, polycarbonate polyurethanes, polyetherester polyurethanes, polyethercarbonate polyurethanes, polycaprolactone polyurethanes, hydrocarbon polyurethanes, aliphatic polyurethanes, aromatic polyurethanes, and combinations thereof.

In some embodiments, the binder includes the aqueous polyurethane dispersion and a water-soluble cross-linking agent. For example, the binder may include 60 to 90% by weight of the aqueous polyurethane dispersion based on 100% by weight of the binder component. The binder may also include from 10 to 40% by weight of the water-soluble cross-linker based on 100% by weight of the binder component. Preferably, the binder component comprises 65 to 85% by weight of the aqueous polyurethane dispersion based on 100% by weight of the binder component and from 0 to 35, for example, 15 to 35% by weight of the water-soluble cross-linking agent based on 100% by weight of the binder component.

The present invention also includes embodiments with not cross-linking agent. For example, house paint has no cross-linking agent.

In yet another embodiment, the binder is an alkyd emulsion.

Alkyd resins are polyester resins which include residues of polybasic, usually di-basic, acid(s) and polyhydroxy, usually tri- or higher hydroxy alcohols and further including monobasic fatty acid residues. The monobasic residues may be derived (directly or indirectly) from oils (fatty acid triglycerides) and alkyd resins are also referred to as oil modified polyester resins. Alkyds used in surface coatings are generally curable usually either from residual carboxyl and hydroxyl functionality or by unsaturation (often multiple unsaturation) in the monobasic fatty acid residues. Some alkyds are used as plasticisers e.g. for other alkyd resins, and these materials are not usually curable. Alkyd resins may include other residues and/or additives to provide specific functionality for the intended end use e.g. sources of additional carboxyl groups may be included to improve water compatibility. Alkyds have found widespread use in paints, particularly solvent based paints. In developing low VOC's formulations, much effort has been directed to making aqueous emulsions of alkyd resins, (including those using mixed solvent/water vehicles). The alkyds are usually formed into an emulsion before incorporation into the paint and emulsification typically involves formation of an alkyd in water emulsion in which the alkyd is dispersed in the water phase as uniformly and generally as finely as possible. To do this emulsifiers, either as single components or in combination, are commonly used.

The alkyd resins used in this invention are typically resins which are the reaction products of:
one or more polybasic (di- or higher basic) organic acid/anhydride: e.g. phthalic anhydride,
one or more polyhydric (usually a tri- or higher) alcohol: e.g. glycerol, and
one or more monobasic fatty acid, usually an unsaturated fatty acid, or one or more ester, particularly triglyceride of such fatty acids: e.g. soya oil, tall oil fatty acids.

The molar proportions of these component monomers are chosen to give the desired physical properties and molecular weight distribution of the resulting polyester. The alkyd resins used in this invention are typically air-curing types as used in surface coating end use applications. Typically alkyd resins used in this invention will have an oil length of from 25 to 100%, typically from 50 to 80%. Siliconized alkyds can also be used. Suitable alkyds are widely available and are used extensively in surface coating applications.

Representative polybasic acids include benzene polycarboxylic acids and their anhydrides, for example, phthalic acid and phthalic anhydride, or trimellitic acid and trimellitic anhydride.

Polyhydric alcohols which have been used in the preparation of alkyds include any that contain at least two hydroxyl groups, such as glycerol, trimethylol propane, pentaerythritol, sorbitol, mannitol, and diols such as ethylene glycol and propylene glycol.

Unsaturated fatty acids that find use in the manufacture of alkyds include the fatty oils. The monobasic fatty acid or triglyceride, often includes unsaturation e.g. vegetable oils or fatty acids, and the presence of unsaturation leads to the air-curing properties of these materials. Most alkyds are film-forming polymers with a relatively low glass transition temperature, typically below 0° C., that are readily pigmented and usually accept additives to form coatings with a wide range of appearance, performance, and application characteristics. Useful fatty acids include those that contain at least two olefinic bonds and at least about 10 carbon atoms, with 16-24 carbon atoms being particularly suitable, such as linoleic, eleostearic and arachidonic. Economical sources of acids are the natural mixtures of acids obtained from drying (fatty) oils such as linseed oil, soya oil, tung oil, etc. Also, any of the drying oils containing fatty acid esters, whether of vegetable or marine life origin, have found use, including linseed oil, soybean oil, tung oil, castor oil, safflower oil, and sardine oil.

Methods of their manufacture of waterborne alkyds or "alkyd emulsions" are well-known in the art; see, for example, U.S. Pat. No. 3,269,967 (to Broadhead), and they are also readily available commercially, for example as provided by DSM (Royal DSM N.V., Heerlen, the Netherlands) under the URADIL trade name, for example URADIL AZ 554 Z-50.

The emulsions will typically contain from 45 to 60, more usually from 40 to 55 and particularly about 50% by weight of the emulsified resin.

The total amount of surfactant, non-ionic and (when used) anionic, used as emulsifier will typically be from 2 to 20%, more usually from 5 to 15%, and desirably from 6 to 10%, by weight based on alkyd resin emulsified. In general lower amounts of emulsifier give emulsions with larger average particle size and usually higher polydispersity, generally implying a longer 'tail' of relatively coarse emulsion droplets. Based on emulsions containing 50% of alkyd resin these correspond to general amounts of surfactant of from 1 to 10%, more usually from 2.5 to 7.5% and desirably from 2.5 to 5% by weight on the total emulsion. The amounts used for emulsions containing other alkyd resin concentrations will vary accordingly.

The liquid alkyd emulsion may include nonionic and anionic surfactants. Any suitable nonionic surfactant may be used, such as polyoxyalkylene alkyl ethers, polyoxyalkylene alkylphenyl ethers, polyoxyalkylene fatty acid esters, polyoxyethylene-polyoxypropylene alkyl ethers, polyoxyalkylene alkylamines, glycerol fatty acid esters, higher fatty acid alkanolamides, alkylglycosides, alkylglucosamides, alkylamine oxides, ethylene oxides, and the like, and mixtures thereof.

Any suitable anionic surfactant may be used, such as a sodium alkyl aryl sulfonates, alkyl sulphonates, alkylpolyether sulphates, alkyl sulfates, fatty acid soaps, salts of hydrox-, hydroperoxy-, polyhydroxy-, epoxy-fatty acids, salts of mono- and polycarboxylic acids, alkyl phosphates, alkyl phosphonates, sodium-dialkyl sufosuccinate, n-alkyl ethoxylated sulfates, perfluorocarboxylic acids, fluoroaliphatic phosphonates, fluoroaliphatic sulphates, and mixtures thereof. In particular embodiments, the anionic surfactant includes sodium dodecyl benzene sulfonate. Typical anionic surfactants are phosphate esters, ether carboxylates, alkyl ether sulphate, alkyl aryl sulphonates or mixtures of these types of anionic surfactants.

Ether carboxylates which can be used in the invention are typically of the formula (XI):

$$R^1O(EO)_n-CH_2CO_2 2M \quad (XI)$$

where
$R^1$ is a $C_{10}$ to $C_{18}$ hydrocarbyl, particularly a $C_{12}$ to $C_{16}$ alkyl, group;
EO is an ethyleneoxy group;
n is from 3 to 10, particularly 4 to 8, especially about 6; and
M is hydrogen, alkali metal, especially Na or K or ammonium (including amine onium).

In formula (XI) $R^1$ can represent mixed groups, e.g., mixed alkyl groups such as mixed $C_{13}$ to $C_{15}$ alkyl groups, as are commonly used in making surfactants and n is an average value and may be non-integral. Ether carboxylates are commonly supplied in the free acid form and for use as surfactants are usually neutralized (see below).

Suitable alkyl aryl sulphonates include alkyl benzene sulphonates, typically $C_8$ to $C_{18}$ linear alkyl benzene sulphonates. These are well known surfactants and are usually sold as salts with suitable bases. If supplied as free acids, they can be neutralized (see below).

When used, the weight ratio of non-ionic surfactant to anionic surfactant, particularly alkyl aryl sulphonate, ether carboxylate or a mixture, is usually from 90:10 to 10:90, desirably 80:20 to 20:80, and particularly 75:25 to 25:75.

In the context of waterborne binders for such purposes as waterborne paints and coatings, an alkyd emulsion may be blended with another polymer emulsion, which latter may, or may not be, an emulsion polymer (i.e. a polymer made by emulsion polymerization). This is readily accomplished since both are presented as dispersions of polymer in water, and a wide variety of base polymers exists both for emulsion polymers and for alkyds in alkyd emulsions. In particular, blends of one or more alkyd emulsion with one or more acrylic emulsion or styrene-acrylic emulsion, or combinations thereof, have gained widespread use. Emulsion polymers are made by emulsion polymerization, which is discussed in detail in D. C. Blackley, Emulsion Polymerization (Wiley, 1975), or, alternatively, it is also discussed in H. Warson, The Applications of Synthetic Resin Emulsions, Chapter 2 (Ernest Benn Ltd., London 1972). Emulsion polymers may be obtained commercially, such as, for example, polymers available under the trade name RHOPLEX or PRIMAL from the Rohm and Haas Company (Philadelphia, Pa., USA). Although emulsion polymers are the mostly widely used waterborne polymers, other dispersions of polymers in water may also be suitable for the purpose of blending with alkyd emulsions. Such dispersions may include polyurethane dispersions (PUD), an acrylic polymer, a styrene-acrylic polymer, a vinylacetate polymer, a vinylacetate-acrylic, an ethylene-vinylacetate, an ethylene-vinylacetate-vinylchloride, a polyurethane, and a polyamide, and other terpolymer dispersions.

Use as a Post-Manufacturing Additive: In another embodiment the amine-imino dialcohol neutralizing agent of the present invention is added to an already existing polyurethane dispersion, polymer latex, or alkyd emulsion alone or in combination with a secondary neutralizing agent such as an alkali, such as sodium or potassium, or with a base, such as an amine. It is assess as a post-manufacturing additive to stabilize the pH of the final product formulation.

Clearcoat Material: The invention also encompasses use of the neutralizing agent with compositions for clearcoat films. An aqueous composition for a clearcoat film comprises a binder and the amine-imino dialcohol neutralizing agent of the present invention, with transparent pigment or an absence of pigment.

The binder is the same as described above, namely a binder comprising a polymer latex, polyurethane dispersion, and/or alkyd emulsion.

U.S. Pat. No. 6,365,679 discloses a two component polyurethane clear coat which includes a polyol component and a polyisocyanate component. The polyol component includes a polyester polyol resin containing a neopentyl glycol resin. A mixture of silane and aziridine is also preferably included in the polyol component. The polyisocyanate component includes a mixture of an isocyanate trimer of hexamethylene diisocyanate and a biuret of hexamethylene diisocyanate. The polyol and polyisocyanate components preferably include two solvents forming a blend selected from the group of ethyl acetate, butyl acetate, propyleneglycolmonomethylether acetate, toluene and xylene.

In one embodiment, the composition of the present invention (for example paints or stains) comprises the selected polymer and aqueous carrier.

In one embodiment, the aqueous carrier comprising water and the treatment solution is in the form of a solution, emulsion, or dispersion of the material and additives. In one embodiment, the liquid carrier comprises water and a water miscible organic liquid. Suitable water miscible organic liquids include saturated or unsaturated monohydric alcohols and polyhydric alcohols, such as, for example, methanol, ethanol, isopropanol, cetyl alcohol, benzyl alcohol, oleyl alcohol, 2-butoxyethanol, and ethylene glycol, as well as alkylether diols, such as, for example, ethylene glycol monoethyl ether, propylene glycol monoethyl ether and diethylene glycol monomethyl ether.

As used herein, terms "aqueous medium" and "aqueous media" are used herein to refer to any liquid medium of which water is a major component. Thus, the term includes water per se as well as aqueous solutions and dispersions.

This invention relates to low or zero VOC dispersions. Thus, preferably the coating composition is substantially free from organic co-solvents. Such co-solvents typically include acetone, n-methyl pyrolidinone, dimethyl formamide, methyl ethyl ketone, toluene, and mixtures thereof. In the context of the subject invention, substantially free of organic co-solvents is intended to indicate the compositions of the present invention, have less than about 25%, preferably less than about 5%, by weight of volatile organic co-solvents based on 100% by weight of the latex or aqueous polyurethane dispersion. Generally, at least 75 wt. % of the aqueous carrier is water.

More preferably, the aqueous polyurethane dispersion has less than about 2.5% by weight of volatile organic co-solvents based on 100% by weight of the aqueous polyurethane dispersion. Organic co-solvent may be included, however, if the polyurethane or prepolymer product is of a high viscosity. If organic co-solvent is used, the organic co-solvent may be removed, partially or completely, by distillation, preferably after the polyurethane is dispersed in the water.

The term "pigment" as used herein includes non-film-forming solids such as pigments, extenders, and fillers. Pigments provide the color and hiding value of the paint. In addition, some pigments are added to impart bulk to the paint at relatively low cost. Pigments are finely ground particles or powders dispersed in the paint formulation. Generally, the mean particle sizes of the pigments range from about 0.01 to about 50 microns. For example, the TiO2 particles used in the aqueous coating formulation typically have a mean particle size of from about 0.15 to about 0.40 microns. Pigments are insoluble in the carrier.

Pigments are always incorporated by simple physical mixing with the medium, and it is this feature that distinguishes them from dyes. Pigments and dyes are often derived from the same basic building blocks. The fundamental difference between them lies in the fact that dyes are soluble in the media in which they are incorporated and pigments are not. Given the large number of pigments and dyes available, a Color Index (CI) categorizes each commercially available product, which is given a generic name and number that summarizes its properties, e.g., Pigment Red 254. In addition, where the chemical constitution of a product has been disclosed, it is typically also allocated a five-figure CI constitution number.

There are two typical categories of pigments, prime pigments and extender pigments (also known as fillers). Prime pigments provide color and are the main source of hiding capability. Titanium dioxide (in both anastase and rutile forms) is the predominant white pigment. It provides whiteness by scattering the incident light and by hiding the surface to which the paint is applied. Color pigments provide color by selective absorption of the incident light. Organic pigments include, for example, copper phthalocyanines such as phthalocyanine blue and phthalocyanine green, quinacridone pigments, and Hansa yellow. Inorganic pigments include, for example, carbon black, iron oxide, cobalt blue, brown oxide, ochres, and umbers.

The prime pigments are typically used with an extender pigment or pigments. Commonly used extender pigments include diatomaceous earth, clays (aluminum silicate) such as kaolin and china clay; silica, diatomaceous silica, and talc (magnesium silicate); barytes (barium sulfate), calcium carbonate (in both ground and precipitated forms), such as chalk powder or marble powder, aluminum oxide, silicon dioxide, magnesium oxide, zinc oxide, zinc sulfite, sodium oxide, potassium oxide, and mixtures thereof. Extender pigments thicken the film, support its structure and increase the volume of the paint. Floor paints that will be subjected to abrasion may contain fine quartz sand as filler. Not all paints include fillers. On the other hand, some paints contain large proportions of pigment/filler and binder.

The pigment can be added to the aqueous coating formulation as a powder or in slurry form. The pigment is preferably present in the aqueous coating formulation in an amount from about 0.1 to about 60 wt. % said at least one pigment about 5 to about 60 wt. %, more preferably from about 10 to about 40 wt. %. The composition, particularly paint compositions and architectural coatings, typically have a pigment to binder ratio of at least about 0.5 by weight. The total weight of pigment used to determine the ratio includes any color pigments, flake pigments, and filler pigments in the composition.

Pigment Volume Concentration (PVC) indicates the relative proportion of pigment to binder in the paint formulation. It is a comparison of the volume of the pigment or pigments to the total volume of the binder or binders and the pigment or pigments. To calculate the volume of each ingredient, it is necessary to divide the amount present in the formulation by its density. Pigment Volume (Vol.) Concentration is calculated by Equation XII:

$$\% \text{ PVC} = [\text{Vol. of Pigments}/(\text{Vol. of Pigments} + \text{Vol. of binder})] \times 100 \qquad \text{XII}$$

Pigment typically reduces the shininess or gloss of the binder, so, in general, the paint becomes less glossy as PVC increases. Typical PVC values associated with different levels of paint gloss are: gloss, 15% PVC; semigloss, 25% PVC; satin, 35% PVC, eggshell, 35-45% PVC; and flat, 38-80% PVC. Higher quality flat paints, both interior and exterior, generally have PVC's of about 38% to 50%.

The pigments and any fillers are typically added to the aqueous coating compositions as dispersions of pigments in aqueous solvent such as is known in the art. In general, dry pigment and the aqueous coating composition are brought into contact under a shear high enough to break the pigment agglomerates down to the primary pigment particles and to wet the surface of the pigment particles. Additional dispersing aids may be included. The breaking of the agglomerates and wetting of the primary pigment particles are important for pigment stability and color development. The pigment dispersions are combined in the basecoat composition.

Clearcoat may have no pigment or it may have a transparent pigment, such as fine iron oxide. An example of a suitable transparent iron oxide pigment is transparent iron oxide pigment having an average particle size, based on the longest needle axis, of less than 0.1 μm, disclosed by U.S. Pat. No. 5,368,640 to Pitzer et al. or DISPERFIN liquid preparations of red and yellow transparent iron oxide available from Rockwood Pigments, Beltsville, Md.

Some formulations of the present invention include surfactants such as anionic surfactants, cationic surfactants, non-ionic surfactants, zwitterionic surfactants, and mixtures thereof. Surfactants may be used as wetting, anti-foaming and dispersing agents in aqueous coating compositions.

Suitable anionic surfactants are known compounds and include, for example, linear alkylbenzene sulfonates, alpha olefin sulfonates, paraffin sulfonates, alkyl ester sulfonates, alkyl sulfates, alkyl alkoxy sulfates, alkyl sulfonates, alkyl alkoxy carboxylates, alkyl alkoxylated sulfates, monoalkyl phosphates, dialkyl phosphates, sarcosinates, isethionates, and taurates, as well as mixtures thereof, such as for example, ammonium lauryl sulfate, ammonium laureth sulfate, triethanolamine laureth sulfate, monoethanolamine lauryl sulfate, monoethanolamine laureth sulfate, diethanolamine lauryl sulfate, diethanolamine laureth sulfate, lauric monoglyceride sodium sulfate, sodium lauryl sulfate, sodium laureth sulfate, potassium lauryl sulfate, potassium laureth sulfate, sodium trideceth sulfate, sodium tridecyl sulfate, ammonium trideceth sulfate, ammonium tridecyl sulfate, sodium cocoyl isethionate, disodium laureth sulfosuccinate, sodium methyl oleoyl taurate, sodium laureth carboxylate, sodium trideceth carboxylate, sodium monoalkyl phosphate, sodium dialkyl phosphate, sodium lauryl sarcosinate, lauroyl sarcosine, cocoyl sarcosinate, ammonium cocyl sulfate, sodium cocyl sulfate, potassium cocyl sulfate, monoethanolamine cocyl sulfate, sodium tridecyl benzene sulfonate, sodium dodecyl benzene sulfonate, and mixtures thereof.

The cationic counterion of the anionic surfactant is typically a sodium cation but may be a potassium, lithium, calcium, magnesium, ammonium cation, or an alkyl ammonium anion having up to 6 aliphatic carbon atoms, such as anisopropylammonium, monoethanolammonium, diethanolammonium, or triethanolammonium cation. Ammonium and ethanolammonium salts are generally more soluble than the sodium salts. Mixtures of the above cations may be used.

Suitable cationic surfactants are known compounds and include, for example, mono-cationic surfactants according to structure (XIII) below:

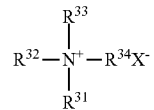

XIII wherein:

$R^{31}$, $R^{32}$, $R^{33}$, and $R^{34}$, are independently hydrogen or an organic group, provided that at least one of $R^{31}$, $R^{32}$, $R^{33}$ and $R^{34}$ is not hydrogen, and $X^-$ is an anion, as well as mixtures of such compounds If one to three of the $R^{31}$, $R^{32}$, $R^{33}$ and $R^{34}$ groups are each hydrogen, then the compound may be referred to as an amine salt. Some examples of cationic amine salts include polyethoxylated (2) oleyl/stearyl amine, ethoxylated tallow amine, cocoalkylamine, oleylamine, and tallow alkyl amine.

For quaternary ammonium compounds R $R^{31}$, $R^{32}$, $R^{33}$ and $R^{34}$ may be the same or different organic group, but may not be hydrogen. In one embodiment, $R^{31}$, $R^{32}$, $R^{33}$ and $R^{34}$ are each C3-C24 branched or linear hydrocarbon groups which may comprise additional functionality such as, for example, fatty acids or derivatives thereof, including esters of fatty acids and fatty acids with alkoxylated groups; alkyl amido groups; aromatic rings; heterocyclic rings; phosphate groups; epoxy groups; and hydroxyl groups. The nitrogen atom may also be part of a heterocyclic or aromatic ring system, e.g., cetethyl morpholinium ethosulfate or steapyrium chloride.

Examples of quaternary ammonium compounds of the monoalkyl amine derivative type include: cetyl trimethyl ammonium bromide, cetyl trimethyl ammonium chloride, myristyl trimethyl ammonium bromide, stearyl dimethyl benzyl ammonium chloride, oleyl dimethyl benzyl ammonium chloride, lauryl/myristryl trimethyl ammonium methosulfate, cetyl dimethyl (2)hydroxyethyl ammonium dihydrogen phosphate, babassuamidopropalkonium chloride, cocotrimonium chloride, distearyldimonium chloride, wheat germ-amidopropalkonium chloride, stearyl octyldimonium methosulfate, isostearaminopropalkonium chloride, dihydroxypropyl PEG-5 linoleaminium chloride, PEG-2 stearmonium chloride, Quaternium 18, Quaternium 80, Quaternium 82, Quaternium 84, behentrimonium chloride, dicetyl dimonium chloride, behentrimonium methosulfate, tallow trimonium chloride and behenamidopropyl ethyl dimonium ethosulfate.

Quaternary ammonium compounds of the dialkyl amine derivative type include, for example, distearyldimonium chloride, dicetyl dimonium chloride, stearyl octyldimonium methosulfate, dihydrogenated palmoylethyl hydroxyethylmonium methosulfate, dipalmitoylethyl hydroxyethylmonium methosulfate, dioleoylethyl hydroxyethylmonium methosulfate, hydroxypropyl bisstearyldimonium chloride, and mixtures thereof.

Quaternary ammonium compounds of the imidazoline derivative type include, for example, isostearyl benzylimidonium chloride, cocoyl benzyl hydroxyethyl imidazolinium chloride, cocoyl hydroxyethylimidazolinium PG-chloride phosphate, Quaternium 32, and stearyl hydroxyethylimidonium chloride, and mixtures thereof.

Typical cationic surfactants comprise dialkyl derivatives such as dicetyl dimonium chloride and distearyldimonium chloride; branched and/or unsaturated cationic surfactants such as isostearylaminopropalkonium chloride or olealkonium chloride; long chain cationic surfactants such as stearalkonium chloride and behentrimonium chloride; as well as mixtures thereof. Suitable anionic counterions for the cationic surfactant include, for example, chloride, bromide, methosulfate, ethosulfate, lactate, saccharinate, acetate and phosphate anions.

Suitable nonionic surfactants include amine oxides, fatty alcohols, alkoxylated alcohols, fatty acids, fatty acid esters, and alkanolamides. Suitable amine oxides comprise (C10-C24) saturated or unsaturated branched or straight chain alkyl dimethyl oxides or alkyl amidopropyl amine oxides. Suitable fatty alcohols include, for example, (C10-C24) saturated or unsaturated branched or straight chain alcohols, more typically (C10-C20) saturated or unsaturated branched or straight chain alcohols. Suitable alkoxylated alcohols include alkoxylated, typically ethoxylated, derivatives of (C10-C24) saturated or unsaturated branched or straight chain alcohols, more typically (C10-C20) saturated or unsaturated branched or straight chain alcohols, which may include, on average, from 1 to 22 alkoxyl units per molecule of alkoxylated alcohol, such as, for example, ethoxylated lauryl alcohol having an average of 5 ethylene oxide units per molecule. Mixtures of these alkoxylated alcohols may be used. Suitable fatty acids include (C10-C24) saturated or unsaturated carboxylic acids, more typically (C10-C22) saturated or unsaturated carboxylic acids, such as, for example, lauric acid, as well as neutralized versions thereof. Suitable fatty acid esters include esters of (C10-C24) saturated or unsaturated carboxylic acids, more typically (C10-C22) saturated or unsaturated carboxylic acids, for example, propylene glycol isostearate, and mixtures thereof. Suitable alkanolamides include aliphatic acid alkanolamides, such as cocamide MEA (coco monoethanolamide) and cocamide MIPA (coco monoisopropanolamide), as well as alkoxylated alkanolamides, and mixtures thereof.

Suitable amphoteric surfactants include for example, derivatives of aliphatic secondary and tertiary amines in which the aliphatic radical can be straight chain or branched and wherein one of the aliphatic substituents contains from about 8 to about 18 carbon atoms and one contains an anionic water-solubilizing group as well as mixtures thereof. Specific examples of suitable amphoteric surfactants include the alkali metal (for example sodium), alkaline earth metal, ammonium or substituted ammonium salts of alkyl amphocarboxy glycinates and alkyl amphocarboxypropionates, alkyl amphodipropionates, alkyl amphodiacetates, alkyl amphoglycinates, and alkyl amphopropionates, as well as alkyl iminopropionates, alkyl iminodipropionates, and alkyl amphopropylsulfonates, such as for example, cocoamphoacetate cocoamphopropionate, cocoamphodiacetate, lauroamphoacetate, lauroamphodiacetate, lauroamphodipropionate, lauroamphodiacetate, cocoamphopropyl sulfonate caproamphodiacetate, caproamphoacetate, caproamphodipropionate, and stearoamphoacetate.

Any Zwitterionic surfactant acceptable for use in the intended end use application and chemically stable at the required formulation pH is suitable for compositions of the present invention. Such Zwitterionic surfactants, include for example, derivatives of aliphatic quaternary ammonium, phosphonium, and sulfonium compounds in which the aliphatic radicals can be straight chain or branched and wherein one of the aliphatic substituents contains from about 8 to about 24 carbon atoms and one contains an anionic water-solubilizing group such as carboxyl, sulfonate, sulfate, phosphate or phosphonate. Specific examples of suitable Zwitterionic surfactants include alkyl betaines, such as cocodimethyl carboxymethyl betaine, lauryl dimethyl carboxymethyl betaine, lauryl dimethyl alpha-carboxy-ethyl betaine, cetyl dimethyl carboxymethyl betaine, lauryl bis-(2-hydroxy-ethyl)carboxy methyl betaine, stearyl bis-(2-hydroxy-propyl)carboxymethyl betaine, oleyl dimethyl gamma-carboxypropyl betaine, and lauryl bis-(2-hydroxy-propyl)alpha-carboxyethyl betaine, amidopropyl betaines, and alkyl sultaines, such as cocodimethyl sulfopropyl betaine, stearyldimethyl sulfopropyl betaine, lauryl dimethyl sulfoethyl betaine, lauryl bis-(2-hydroxy-ethyl)sulfopropyl betaine and alkylamidopropylhydroxy sultaines.

Typically there is an absence of polyethylene oxide polypropylene oxide copolymer surfactant having an HLB (hydrophilic/lipophilic balance) of less than 15 disclosed by US Patent Application Publication No. 2007/0077865 to Dysard et al. For example, there is an absence of polyethylene oxide/polypropylene oxide copolymer end-functionalized with a primary hydroxyl group or a secondary hydroxyl group such as those disclosed by US Patent Application Publication No. 2007/0077865 to Dysard et al.

In addition, the coating formulation in accordance with the invention can optionally contain additives such as one or more film-forming aids or coalescing agents. Suitable firm-forming aids or coalescing agents include plasticizers and drying retarders such as high boiling point polar solvents.

Coalescing agents are high boiling point solvents (that are slow to evaporate) used to reduce the minimum film formation temperature (MFFT) of paints, inks, other coating compositions and the like. In paint formulations in particular, coalescing agents act as temporary plasticizers to reduce the glass transition temperature (Tg) of the latex below that of the drying temperature to allow for good film formation. Generally, coalescing agents function by softening the polymer particles in a latex, enabling the formation of a continuous film as the coating cures. It is desirable for the coalescing agent to have low water solubility, which increases its effectiveness, and have good hydrolytic stability. A typical paint formulation contains between 0.1-10% coalescing agent, which is used to aid in the formation of a continuous film as the paint cures. A typical coalescing agent is Eastman Chemical's TEXANOL ester alcohol (2,2,4-trimethyl-1,3-pentanediol monoisobutyrate). Other coalescing agents are disclosed by U.S. Pat. No. 7,695,557 to Zhou et al derived from one or more by-products in the reaction, synthesis and/or production of adipic acid utilized in the production of polyamide, the coalescent composition comprising (A) a blend of ethyl, propyl, and/or isopropyl diesters of a mixture of adipic diacids, glutaric diacids, and succinic diacids ("AGS"), (B) a blend of ethyl, propyl, and/or isopropyl diesters of a mixture of adipic, methylglutaric, and ethylsuccinic diacids ("MGA"), or (C) a mixture or blend of (A) and (B). A primary characteristic of a coalescing agent is the efficiency in which it enables a consistent film to form and this was determined by measuring the Minimum Film Forming Temperature (MFFT).

The coating formulation optionally also includes other conventional coating additives such as, for example, dyes, wetting agents, dispersants, surfactants, wetting agents, rheology modifiers such as, for example, synthetic clay, defoamers, thickeners, biocides, mildewcides, colorants such as colored pigments and dyes, waxes, perfumes, co-solvents, light stabilizers, ultraviolet light stabilizers, heat stabilizers (particularly for baked coatings), mar/slip aids, and flatting agents. Since the ingredients are optional, the present invention encompasses embodiments with or without these ingredients.

The coating compositions are typically formulated so the dried coatings comprise at least 10% by volume of dry polymer solids, and additionally 5 to 90% by volume of non-polymeric solids in the form of pigments. The dried coatings can also include additives such as plasticizers, dispersants, surfactants, rheology modifiers, defoamers, thickeners, additional biocides, additional mildewcides, colorants, waxes, and the like, that do not evaporate upon drying of the coating composition. Preferably the compositions have an absence of an abrasive.

Co-solvents are sometimes present in the paint formulation to aid in film formation, to resist freezing, and/or enhance brushing properties, such as by increasing open time. Open time is the time that a coating remains workable after it has been applied to a substrate. Open time allows for rebrushing or "melting in" of the newly applied coating at the lap, without causing brush marks, loss of gloss, or lap lines in the final dried coating. A lap is an area on a substrate where additional coating is applied onto a portion of a previously coated, but still wet, adjacent substrate area. Typically the amount of co-solvent may be 10 to 20 percent or more based on total liquid content of the paint formulation. Typical co-solvents are short chain water-soluble alcohols and glycols, such as ethylene glycol, diethylene glycol, propylene glycol, and glycerin. However, these co-solvents negate some of the advantages of aqueous coatings such as low tack, low odor, and low pollution. Because co-solvents are generally volatile organic compounds, only the minimum amounts necessary are used. An advantage of the N-alkyldialkanolamine used as neutralizing agent in the method according to the present invention is that its presence in the formulation increases the open time so that it lowers the minimum amount of co-solvent require to achieve the desired open time.

Leveling agents are added to change the surface tension and improve wetting. Leveling agents are a subset of surfactants used to insure that a paint formulation flows out over and completely wets the surface being painted. Reduced contact angles between the paint formulation and the surface lead to better flow leveling, and better surface wetting allows for better adhesion of the wet paint formulation and the dried paint film. Surfactants are also important as grinding aids for pigment grinding operations.

Rheology modifiers are added to thicken the paint formulation and to increase its yield stress, thus allowing for the formation of a stable suspension of pigments in resin upon mixing. Rheology modifiers are also added to optimize the application properties of the paint. Pigment dispersants are added to create a stable dispersion of the pigment. Pigment dispersants function by directly interacting with pigment particles both mechanically and electrostatically. Rheology modifiers function by increasing the yield stress of the water-resin system.

Defoamers have the effect of decreasing the foaminess of an agitated paint formulation, when it is manufactured, when it is shaken or stirred, and when it is applied to a surface. Defoamers are commercially available under a number of trade names such as, for example, RHODOLINE, FOAMASTER, ADVANTAGE 1512, and BYK 1650.

Corrosion inhibitors and flash rust inhibitors, while not essential, are added to a number of latex paints to suppress the migration of colored corrosion products from the surface of painted metal objects (e.g., exposed nail heads in drywall) to the surface of the paint. Also, some paint formulators add rust inhibitors to prevent corrosion of iron alloy paint cans during paint storage.

Biocides and mildewcides are added to control microbial growth in the paint formulation and/or in the paint film. Microbes can colonize latex paints leading to filamentous growths, bad odors and the selective consumption of functional paint ingredients. Some biocides are added solely to control microbes during storage of the paint formulation (so called in-can biocides) while other biocides are added to impart biostability to the dried/cured paint film (so called dry film biocides). Some biocides can prevent both in-can and dry film biological growth. Typical biocides include isothiazolinones, such as 5-chloro-2-methyl-4-isothizolin-3-one; benzoisothiazolinones; triazines, such as hexahydro-1,3,5-tris-2-hydroxyethyl-s-triazine; 1-(3-chloroallyl)-3,5,7-triaza-1-azoniaadamantane chloride (DOWICIL 75); zinc pyrithione; gluteraldehyde; bronopol; and phenolics.

The aqueous coating formulations of the invention typically includes less than 10% of anti-freeze agents based on the total weight of the aqueous coating formulation. Exemplary anti-freeze agents include ethylene glycol, diethylene glycol, propylene glycol, glycerol (1,2,3-trihydroxypropane), ethanol, methanol, 1-methoxy-2-propanol, 2-amino-2-methyl-1-propanol, and FTS-365 (a freeze-thaw stabilizer from Inovachem Specialty Chemicals). More preferably, the aqueous coating formulation includes less than 5.0% or is substantially free (e.g. includes less than 0.1%) of anti-freeze agents.

Accordingly, the aqueous coating formulation of the invention preferably has a VOC level of less than about 100 g/L and more preferably less than or equal to about 50 g/L and still more preferably less than or equal to about 10 g/L.

The present composition may further include a hydrophobically modified alkali soluble emulsion as a thickener. The hydrophobically modified alkali soluble emulsion (HASE) is an aqueous dispersion of a HASE copolymer comprising an acylate ester or methacrylate ester (such as ethyl methacrylate and methyl methacrylate); methacrylic acid, acrylic acid, or itaconic acid; and an ethylenically unsaturated polyethylene oxide (polyEO) macromonomer modified with an alkyl or aralkyl hydrophobe, as illustrated by either of following structures XIV and XV:

or

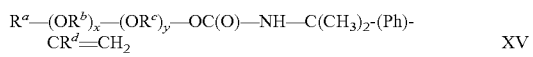

ethylenically unsaturated hydrophobically modified poly EO macromonomer (also termed the HASE polymer), wherein $R^a$ is the hydrophobic portion, preferably a C8-C24 alkyl or aralkyl group; x+y is 10 to 100, preferably 10 to 50; $R^b$ and $R^c$ are each independently $CH_2CH_2$, $CH_2CH(CH_3)$, or $CH_2CH_2CH_2CH_2$, preferably $R^b$ and $R^c$ are both $CH_2CH_2$; $R^d$ is H or C1-C6-alkyl, preferably methyl; and Ph is a phenylene group.

The HASE preferably contains from about 50 to 65 weight percent of units from ethyl acrylate, about 35 to 60 weight percent of units from methacrylic acid, and about 1 to 20 weight percent of units of the hydrophobically modified macromonomer. The preferred HASE composition may also include from about 0.01 to about 1 weight percent of units of a cross-linking agent, which is typically a diethylenically unsaturated compound such as divinyl benzene, allyl methacrylate, diallyl phthalate, trimethylol propane triacrylate, 1,6-hexanediol diacrylate, ethylene glycol diacrylate or dimethacrylate. The HASE has a weight average molecular weight Mw ranging from 100,000 to several million Daltons. The concentration of HASE in the formulation is typically in the range of 0.1 to 1.0% based on total solids of the HASE and the total weight of the formulation.

The HASE may also contain from about 0.05 to about 5 percent by weight, based on the weight of total monomers, of a chain transfer agent to obtain molecular weights in the lower part of the range or even down to about 8000 Daltons. Examples of suitable chain transfer agents include hydroxyethyl mercaptan, beta-mercaptopropionic acid, and C4-C22-alkylmercaptans.

However, the present invention also includes embodiments having an absence of a hydrophobically modified alkali soluble emulsion, in other words an absence of HASE polymer.

The additives are optional. Thus, the present invention includes embodiments having an absence of any one or more of these additives.

The balance of the aqueous coating formulation of the invention is water. Much of the water is present in the polymer latex dispersion or polyurethane dispersion and in other components of the aqueous coating formulation. However, water is generally also added separately to the aqueous coating formulation.

The compositions and methods of the present invention do not produce a foamed product. The present invention has an absence of foaming agent. For example, the present invention avoids the blowing agents of US 2006/0058405 to Felber et al and US 2010/0179297 to Pratt et al. The blowing agents of Felber et al are exemplified by low boiling point hydrocarbons such as butane, and pentane, halogenated hydrocarbons, carbon dioxide, acetone, and/or water. Felber et al discloses halogenated hydrocarbons such as halogenated methanes and halogenated ethanes may be used. Felber et al discloses, use of chlorofluorocarbon compounds such as dichlorotrifluoroethane (R-123), dichloromonofluoroethane (R-141b), and the like. Felber et al states, the words "blowing agent" as used by Felber et al includes any and all of the aforesaid blowing agents, including mixtures thereof. Pratt et al. produces foams polyurethane by incorporation of blowing agents such as those commonly used in the art. Such blowing agents include but are not limited to halogenated low-boiling hydrocarbons, hydrochlorofluorocarbons, hydrofluorocarbons, chlorofluorocarbons, pentanes, nitrogen, air, and carbon dioxide. The Pratt et al. polyurethanes can include water to help create a foam. If used, Pratt et al teaches the amount of water is typically about 0.1 to about 7 parts per hundred parts of polyol.

In one embodiment, the aqueous formulations as described herein further comprises one or more materials selected from the group consisting of: fillers, reflecting agents, coalescing agent, thickeners, dispersants, rheology modifiers, crosslinking agents, wetting agents, defoamers, leveling agents, surfactants, corrosion inhibitors, additional amino alcohol compounds, colorants, waxes, perfumes, co-solvents, and biocides. In another embodiment, the aqueous formulation has no added cross-linking agent, or in another embodiment, has an absence of cross-linking agent. In yet another embodiment, the aqueous formulation has no added blowing agent, or in a further embodiment, has an absence of blowing agent.

Water at the concentrations employed in the present invention is not a foaming agent.

Typically there is an absence of photochromic compound such as that of US Patent Application Publication No. 2007/0202290 to Selinfreund. A photochromic compound is a compound that changes from one color state to another color state with different absorption spectra upon exposure to radiant energy. Particular photochromic materials disclosed by US Patent Application Publication No. 2007/0202290 to Selinfreund include a compound of formula XVI:

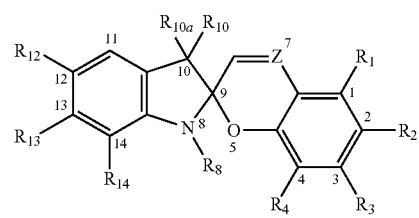

wherein R1, R2, R3, R4, R8, R10, R10a, R11, R13, and R14 are independently selected from the group of: a hydride, OH, Cl, F, Br, I, CN, NO2, and a linear or branched C1-C6 alkyl, C2-C6 alkenyl, or C3-C6 alkynyl, C4-C10 (cycloalkyl)alkyl or (cycloalkenyl)alkyl, (cycloheteryl)alkyl, (cycloaryl)alkyl; and wherein R2 and R3, R3 and R4, R1 and R2 independently may from a ring respectively with each other, such ring which may be substituted with a moiety selected from the group of: a hydride, OH, Cl, F, Br, I, CN, NO2, and a linear or branched C1-C6 alkyl, C2-C6 alkenyl, or C3-C6 alkynyl, C4-C10 (cycloalkyl)alkyl or (cycloalkenyl)alkyl, (cycloheteryl)alkyl, (cycloaryl)alkyl; and Z is C or a heteroatom selected from N, O and S.

Typically there is an absence of photobleachable compound such as that of US Patent Application Publication No. 2007/0202290 to Selinfreund. A photobleachable compound is a compound that upon exposure to light decreases in absorbance intensity or emission intensity, for example, KF 1166 photobleachable IR dye from Honeywell (Morristown, N.J.).

In at least some embodiments there is an absence of tertiary amines. Tertiary amines are tertiary amine compounds having alkane, aralkyl, cycloalkyl or aryl groups as sidechains.

The present invention will now be further described by the following non-limiting examples. The following examples in which all parts and percentages are by weight unless otherwise indicated are presented to illustrate a few embodiments of the invention. As described in further detail hereinafter, performance of the neutralizers of the present invention are tested as neutralizing, co-dispersing agents and compared relative to commercial neutralizers in an aqueous based, latex semi-gloss formulation and aqueous based, latex flat formulations.

EXAMPLES

Example 1

Synthesis of 1,1'-[[3-(Dimethylamino)propyl]-imino]bispropan-2-ol (DMAPA-2PO, Compound A)

A 1.5 liter pressurized vessel is charged with 408 grams (4.0 moles) of dimethylaminopropylamine. It is pressurized to 1 barg with nitrogen and released to atmosphere three times. Then it is pressurized to 1 barg with nitrogen. The vessel is heated to 130° C., and 476 grams (8.2 moles) of propylene oxide is added slowly under agitation over 2-3 hours. The mixture is then stirred at least 2 hours until pressure stabilizes. Then the vessel is cooled to 80° C., released pressure and purged with nitrogen for 1 hour. After the reaction is completed the vessel is cooled to 30° C. and discharged. In a separate vessel, under nitrogen atmosphere, the material just made is distilled at 135° C. and 3 mmHg pressure to a maximum vapor temperature of 115° C., which results in about 750 grams of 1,1'-[[3-(Dimethylamino)propyl]-imino]bispropan-2-ol (DMAPA-2PO, compound A) as slightly yellowing clear liquid. IR, $^1$H and $^{13}$C-NMR analysis are consistent with the desired structure.

Same process is applied to make 1,1'-[[3-(Dimethylamino)propyl]-imino]bispropan-2-ol with 2.5 PO (DMAPA-2.5PO, a 50/50 blend of Compound A and Compound B), 2,2'-[[3-(Dimethylamino)propyl]-imino]bisethanol with 2EO (DMAPA-2EO, Compound C), and 2,2'-[[3-(Dimethylamino)propyl]-imino]bisethanol with 2.5EO (DMAPA-2.5EO, a 50/50 blend of Compound C and Compound D). In preparation of compound C and D ethylene oxide is used instead of propylene oxide.

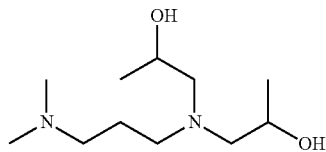

A

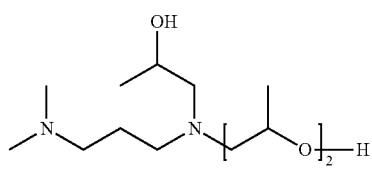

B

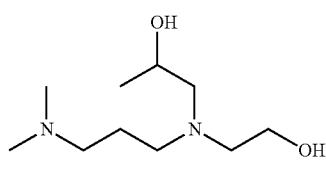

C

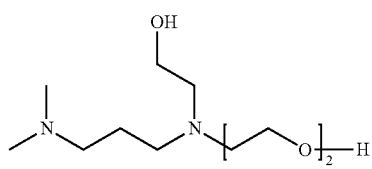

D

Example 2

Titration for Neutralization Power Evaluation

Aqueous titrations of amines are done on a titrator with 0.1N HCl solution. FIG. 1 shows titration curves and neutralizing power of the amines of the present invention in comparison with the commercial neutralizers and 28% ammonia, Comparative Example 1 containing 2-amino-2-methyl-1-propanol (AMP) (AMP-95 manufactured by Angus), Comparative Example 2 containing 2-amino-2-ethyl-1,3-propanediol (AEPD) (AEPD VOX-1000 manufactured by Dow), Comparative Example 3 containing N-butyldiethanolamine (NBDA) (VANTEX-T manufactured by Tam inco), and Samples of the present invention containing DMAPA-2PO, DMAPA-2.5PO, DMAPA-2EO, DMAPA-2.5EO.

FIG. 1 shows Sample 1 to Sample 4 of the present invention containing DMAPA-2PO, DMAPA-2.5PO, DMAPA-2EO, DMAPA-2.5EO have stronger neutralizing power than AEPD and NBDA.

The above listed compositions are also calculated based on the titration curves to determine the amount of amine needed to reach a pH of 8.5 or 9.0 for an aqueous solution which also indicated the relative neutralizing efficiency.

TABLE 1 shows the results. It requires much less amines of the present invention to reach pH 9 or higher due to the stronger neutralization power than NBDA and AEPD.

TABLE 1

Amine Needed to Reach pH 8.5 or 9.0

| | Neutralizing agent | Amine Needed: grams per 1 mole HCl | |
| --- | --- | --- | --- |
| | | pH 8.5 | pH 9.0 |
| Comparative Sample 4 | Ammonia (28%) | 72 | 95 |
| Comparative Sample 1 | AMP-95 | 100 | 115 |
| Comparative Sample 2 | VOX 1000 | 198 | 396 |
| Comparative Sample 3 | VANTEX T | 230 | 401 |
| Sample 1 | DMAPA-2PO | 228 | 264 |
| Sample 2 | DMAPA-2.5PO | 246 | 298 |
| Sample 3 | DMAPA-2EO | 196 | 241 |
| Sample 4 | DMAPA-2.5EO | 232 | 296 |

AMP-95 has the following structural formula XVII.

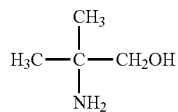

XVII

VOX 1000 has the following structural formula XVIII.

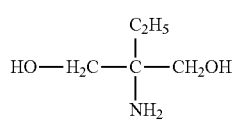

XVIII

VANTEX has the following structural formula XIV.

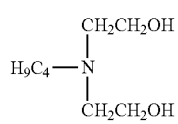

XIX

Example 3

VOC Measurement

The VOC level of the samples was also compared for Example 1 of the present invention containing 1,1'-[[3-(Dimethylamino)propyl]-imino]bispropan-2-ol, and Comparative Example 2 containing AEPD (VOX-1000), and Comparative Example 3 containing NBDA (VANTEX-T). The VOC values are determined by Gas Chromatograph measurement following ASTM D6886 and ISO 11890-2. The Gas chromatograph (GC) conditions were as follows: column DB-5 (30 m×0.32 mm×0.25 um); injection temperature 250 degrees C.; temperature ramp: 50 degrees C. for 12 minutes and then to 320 degrees C. at 30 degrees per minute; flow rate 2.1 ml/min constant flow mode.

TABLE 2 shows the results. DMAPA-2PO of the present invention is almost zero VOC, while Comparative Example 2 and Example 3 gave 100% VOC.

TABLE 2

VOC Level, Gas Chromatograph Measurement

| Amines | % VOC vs. Tetradecane (250° C.) |
| --- | --- |
| Sample 1 | 0.091 |
| Comparative Example 2 | 100 |
| Comparative Example 3 | 100 |

Example 4

Dispersing Efficiency

The DMAPA-2PO of the present invention was also tested to determine the efficiency of the compounds as a dispersing agent in comparison with AMP-95 (manufactured by Angus), AEPD (AEPD VOX-1000 manufactured by Dow), NBDA (VANTEX-T manufactured by Tam inco), and a traditional polymeric dispersant. The evaluation was conducted by a dispersant demand for titanium dioxide with the following procedure.

1. 160 grams DI (deionized) water was charged into a metal container.

2. 520 grams titanium dioxide was added into the water under agitation by using a high speed disperser.

3. The slurry was mixed at high speed for 6-10 minutes.

4. The slurry viscosity was measured using Brookfield Viscometer at 12 or 60 rpm.

5. Small amount of dispersant was added to the slurry and mixed at 1500 rpm for 1 minute.

6. The slurry was allowed to sit for 1 minute. The viscosity was then measured.

7. Steps 5 and 6 were repeated until a minimum viscosity reached.

8. The process then was continued until a 50% or more excess of dispersant added.

Figure 2:
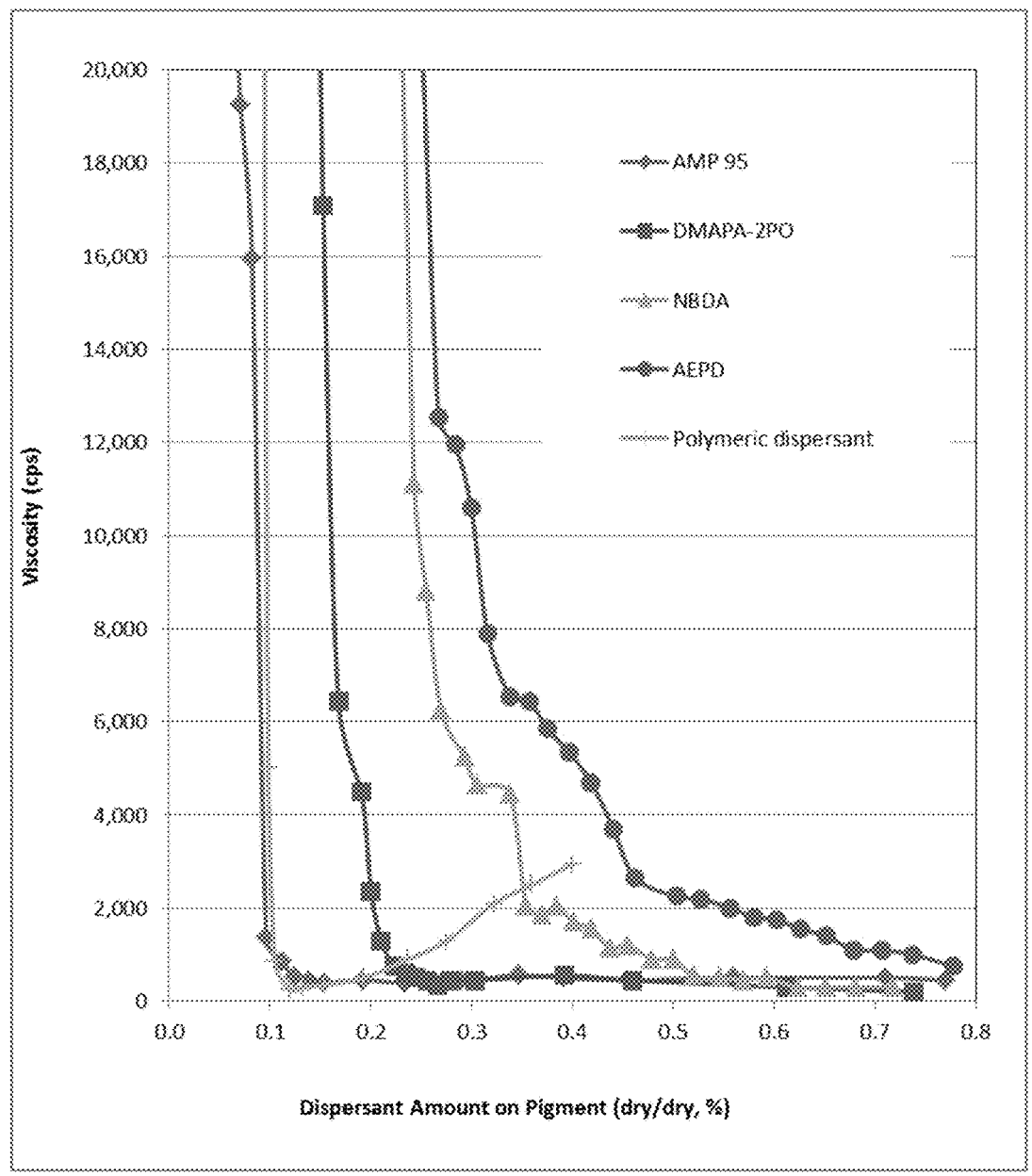
FIG. 2 shows the dispersing efficiency test results of Example 4.

FIG. 2 shows the dispersing efficiency test results as a dispersant demand curve for TiO2. It shows DMAPA-2PO of the present invention has stronger dispersing power than NBDA and AEPD.

Example 5

Evaluation as Neutralizing and Co-Dispersing Agents in Zero VOC Semi-Gloss Acrylic Latex Paint DMAPA-2PO and DMAPA-2EO compounds of the present invention are tested as neutralizing and co-dispersing amines in a zero VOC semi-gloss acrylic latex paint. Paint samples were also prepared for comparative examples with the neutralizers, namely AMP-95 from Angus, AEPD (VOX-1000 from Dow), NBDA (VANTEX-T from Tam inco).

The acrylic paint formulation details are provided in TABLE 3. TABLE 3A provides additional information regarding the ingredients listed in TABLE 3.

TABLE 3

Paint Formulation [Acrylic Semi-Gloss] for testing:

| Raw materials | NH3 (28%) | AMP 95 | NBDA | AEPD | DMAPA-2PO | DMAPA-2EO |
|---|---|---|---|---|---|---|
| Pigment Grind | | | | | | |
| Water | 112.00 | 112.00 | 112.00 | 112.00 | 112.00 | 112.00 |
| Ammonia (28%) | 1.80 | | | | | |
| AMP 95 | | 2.00 | | | | |
| NBDA | | | 5.00 | | | |
| AEPD | | | | 5.00 | | |
| DMAPA-2PO | | | | | 3.60 | |
| DMAPA-2EO | | | | | | 3.60 |
| Kathon LX 1.5% | 2.00 | 2.00 | 2.00 | 2.00 | 2.00 | 2.00 |
| Rhodoline 111 | 8.50 | 8.50 | 8.50 | 8.50 | 8.50 | 8.50 |
| Rhodoline 688 | 2.00 | 2.00 | 2.00 | 2.00 | 2.00 | 2.00 |
| Tiona 595 | 270.00 | 270.00 | 270.00 | 270.00 | 270.00 | 270.00 |
| Attagel 50 | 3.00 | 3.00 | 3.00 | 3.00 | 3.00 | 3.00 |
| Letdown | | | | | | |
| Water | 80.00 | 80.00 | 80.00 | 80.00 | 80.00 | 80.00 |
| Acronal PLUS 4130 | 500.00 | 500.00 | 500.00 | 500.00 | 500.00 | 500.00 |
| Rhodoline 688 | 3.00 | 3.00 | 3.00 | 3.00 | 3.00 | 3.00 |
| Rhodoline FT100 | 5.00 | 5.00 | 5.00 | 5.00 | 5.00 | 5.00 |
| Rhodoline 4160 | 2.00 | 2.00 | 2.00 | 2.00 | 2.00 | 2.00 |
| Aquaflow NHS300 | 30.00 | 30.00 | 30.00 | 30.00 | 30.00 | 30.00 |
| Aquaflow NLS220 | 16.00 | 16.00 | 16.00 | 16.00 | 16.00 | 16.00 |
| Water | 34.20 | 34.00 | 31.00 | 31.00 | 32.40 | 32.40 |
| Total | 1069.50 | 1069.50 | 1069.50 | 1069.50 | 1069.50 | 1069.50 |
| Weight Solids, % | 50.9 | 50.9 | 50.9 | 50.9 | 50.9 | 50.9 |
| PVC, % | 23.7 | 23.7 | 23.7 | 23.7 | 23.7 | 23.7 |

TABLE 3A

Paint Formulation [Acrylic Semi-Gloss] for testing

Ingredients Summary

| | |
|---|---|
| Water | |
| Ammonia (28%) | |
| AMP 95 | Comparative compound (co-dispersant and neutralizing amine) from Dow Chemical-Angus |
| NBDA | Comparative compound VANTEX T (neutralizing agent) from Taminco |
| AEPD | Comparative compound VOX-1000 Neutralizing Amine from Dow Chemical-Angus |
| DMAPA-2PO | Compound of the invention |
| DMAPA-2EO | Compound of the invention |
| KATHON LX 1.5% | Preservative microbicide from Dow |
| RHODOLINE 111 | Copolymer dispersant from Solvay Novecare |
| RHODOLINE 688 | Defoamer from Solvay Novecare |
| TIONA 595 | Titanium dioxide pigment from Cristal Global |
| ATTAGEL 50 | Attapulgite clay rheology modifier from BASF |
| Letdown | |
| Water | |
| ACRONAL PLUS 4130 | All-acrylic latex polymer from BASF |
| RHODOLINE 688 | Defoamer from Solvay Novecare |
| RHODOLINE FT100 | Free-thaw stabilizer and wetting agent from Solvay; Poly(oxy-1,2-ethanediyl),.alpha.-[tris(1-phenylethyl)phenyl]-.omega.-hydroxy (99734-09-5) |
| RHODOLINE 4160 | Anionic wetting and dispersing agent, ammonium salt from Solvay |
| AQUAFLOW NHS-300 | Nonionic associative polymer Rheology modifier from Ashland (hydrophobically modified polyether; See Examples 4 and 32 U.S. Pat. No. 5,574,127) |
| AQUAFLOW NLS-220 | Nonionic associative polymer Rheology modifier from Ashland |
| Water | |

The paint properties of viscosity, gloss, opacity, film yellowing, scrub resistance, block resistance, and adhesion, are tested by following the test procedure described as below.

Viscosity: viscosity of the formulated paint is measured according to ASTM D562 for Stormer viscosity and ASTM D 4287 for high shear ICI viscosity.

Spectral gloss: The paints are drawn down on sealed Leneta charts with 3 mils bird drawdown bar and the films are allowed to dry 7 days at room temperature. The gloss is measured at 3 points on the paint films at 20°, 60°, and 85° with spectral gloss meter and average readings are recorded.

Scrub resistance: The scrub resistance is tested in accordance with ASTM D2486. The wet paints are applied to a Leneta black chart with 7 mils drawdown bar and allowed to dry 7 days at room temperature. The coated charts are loaded over a shim on the glass plate in the Gardco scrub tester so that the coating film is perpendicular to the direction of nylon brushes. 7 mL of standardized scrub media (Leneta SC-2) is applied evenly into the brushes and 5 mL water is added to the test panels at beginning. At every 400 cycles, the scrub process will be stopped automatically and 7 mL of scrub medium and 5 mL water are added to the scrub panels before continuous testing.

Blocking resistance: Blocking resistance of the paint films is measured according to ASTM D4946. The wet paint is drawn down on a Leneta chart (WB) using a 3 mil drawdown bar and the films are allowed to dry at room temperature (RT) for 24 hours and 7 days. Then the blocking resistance is tested by following the standard procedure at room temperature and elevated temperature in oven at 120° F.

Adhesion: The adhesion of paint is tested in accordance with ASTM D3359 B. The test paint and control paint are drawn down side by side on an aged alkyd substrate with 3 mils drawdown bar. The paint films are allowed to dry for 7 days at room temperature. Then the adhesion test is conducted by following the standard procedure.

Flow and leveling: flow and leveling properties of the paint is tested in accordance with ASTM D4062.

Sag resistance: Sag resistance of the paint is tested according to ASTM D4400.

Opacity: Opacity of the dried paint is measured in accordance with ASTM D2805.

Yellowness index and b value: Yellowness index and b value of dried paint films are measured by following standard procedure ASTM E313.

TABLE 4 shows the performance of the neutralizing agents in Zero VOC Acrylic Semi-Gloss Paint.

Less amount of DMAPA-2PO and DMAPA-2EO of the present invention is required to reach similar pH level of the paint than the comparative samples of NBDA and AEPD due to the stronger neutralizing power of the inventive compounds. Other performances are very comparable for all the samples tested, including viscosity, gloss, opacity, yellowing, sag resistance, flow and leveling, scrub and blocking resistance, adhesion.

TABLE 4

Performance-Zero VOC Acrylic Semi-Gloss Paint

| | Amines | | | | | |
|---|---|---|---|---|---|---|
| | NH3 (28%) | AMP 95 | NBDA | AEPD | DMAPA-2PO | DMAPA-2EO |
| Amine Level (lbs/100 gals) | 1.8 | 2 | 5 | 5 | 3.6 | 3.6 |
| pH (equilibrated) | 8.9 | 8.9 | 9.0 | 9.1 | 9.0 | 9.0 |
| Viscosity (KU) | 96 | 94 | 92 | 94 | 96 | 97 |
| Viscosity (ICI) | 1.7 | 1.8 | 1.8 | 1.8 | 1.7 | 1.7 |
| Gloss (20/60 degrees) - 3 mils DD | 27/61 | 26/61 | 26/61 | 26/62 | 28/62 | 27/62 |
| Opacity - 3 mil DD | 97.89 | 98.02 | 97.64 | 97.97 | 97.85 | 97.91 |
| Yellowness index | 1.93 | 2.1 | 2.02 | 2.07 | 2.04 | 2.04 |
| B Value | 1.27 | 1.36 | 1.34 | 1.36 | 1.35 | 1.35 |
| Sag Resistance | 10 | 8 | 8 | 10 | 8 | 8 |
| Flow and Leveling | 10 | 10 | 10 | 10 | 10 | 10 |
| Scrub Resistance | 900 | 1040 | 1010 | 930 | 920 | 910 |
| Block Resistance | | | | | | |
| 1 Day RT/Oven | 6/5 | 7/5 | 7/5 | 5/4 | 7/6 | 7/6 |
| 7 Day RT/Oven | 7/6 | 8/7 | 7/7 | 6/5 | 8/7 | 8/7 |
| Adhesion (7 day, wet/dry) | 5/5 | 5/5 | 5/5 | 5/5 | 5/5 | 5/5 |

The heat-aging stability of the paint is also evaluated. All the paint samples are placed in oven for 2 weeks at 140° F., then the paint properties are tested by following the procedures described above, including pH, viscosity, gloss, opacity, yellowing, scrub resistance, blocking resistance, adhesion. Results show that all the performances are comparable for the samples tested except the pH of DMAPA=2PO and DMAPA-2EO dropped a little more than the comparative samples.

TABLE 5

Heat-Aging Test for Acrylic Semi-Gloss Paint

| | Amines | | | | | |
|---|---|---|---|---|---|---|
| | NH3 (28%) | AMP 95 | NBDA | AEPD | DMAPA-2PO | DMAPA-2EO |
| pH (equilibrated) | 8.2 | 8.5 | 8.7 | 8.7 | 8.3 | 8.3 |
| Viscosity (KU) | 107 | 101 | 98 | 101 | 102 | 103 |
| Viscosity (ICI) | 1.3 | 1.3 | 1.1 | 1.4 | 1.3 | 1.2 |
| Gloss (20/60 degrees) | 26/63 | 25/61 | 28/66 | 28/65 | 28/64 | 27/64 |
| Hidding | 98.07 | 98.47 | 98.38 | 98.21 | 98.56 | 98.52 |
| Yellowness index | 1.93 | 1.93 | 2.15 | 1.82 | 2.11 | 2.01 |
| B Value | 1.27 | 1.27 | 1.39 | 1.22 | 1.37 | 1.32 |
| Scrub Resistance | 1310 | 1290 | 1320 | 1430 | 1320 | 1290 |
| Block Resistance | | | | | | |
| 1 Day RT/Oven | 6/4 | 6/4 | 6/5 | 6/4 | 6/5 | 6/5 |
| 7 Day RT/Oven | 7/5 | 8/5 | 7/6 | 6/4 | 8/6 | 8/6 |
| Adhesion (7 day, wet/dry) | 5/5 | 5/5 | 5/5 | 5/5 | 5/5 | 5/5 |

Example 6

Evaluation as Neutralizing and Co-Dispersing Agent in Zero VOC Vinyl Acrylic Latex Flat Paint The compound DMAPA-2PO is tested as neutralizing and co-dispersing agent in a zero VOC flat vinyl acrylic latex paint. Paint samples were also prepared for comparative examples with the neutralizers, namely AMP-95 from Angus, AEPD (VOX-1000 from Dow), NBDA (VANTEX-T from Taminco). TABLE 6 lists the raw materials and TABLE 6A lists additional information regarding some of these raw materials.

TABLE 6

Paint Formulation of Vinyl Acrylic Latex Flat Paint

| Raw materials | NH3 (28%) | AMP 95 | NBDA | AEPD | DMAPA-2PO |
|---|---|---|---|---|---|
| Pigment Grind | | | | | |
| Water | 310.0 | 310.0 | 310.0 | 310.0 | 310.0 |
| NATROSOL PLUS 330 | 2.0 | 2.0 | 2.0 | 2.0 | 2.0 |
| Ammonia (28%) | 1.6 | | | | |
| AMP 95 | | 1.5 | | | |
| NBDA | | | 4.0 | | |
| AEPD | | | | 4 | |
| DMAPA-2PO | | | | | 3 |
| RHODOLINE 226/35 | 7.0 | 7.0 | 7.0 | 7.0 | 7.0 |
| RHODOLINE 4160 | 3.0 | 3.0 | 3.0 | 3.0 | 3.0 |
| RHODOLINE 688 | 2.0 | 2.0 | 2.0 | 2.0 | 2.0 |
| TIONA 595 | 230.0 | 230.0 | 230.0 | 230.0 | 230.0 |
| OMYACARB 3 | 100.0 | 100.0 | 100.0 | 100.0 | 100.0 |
| MINEX 4 | 132.0 | 132.0 | 132.0 | 132.0 | 132.0 |
| ATTAGEL 50 | 4.0 | 4.0 | 4.0 | 4.0 | 4.0 |
| Letdown | | | | | |
| Water | | | | | |
| ENCOR 320 | 300.0 | 300.0 | 300.0 | 300.0 | 300.0 |
| RHODOLINE 688 | 3.0 | 3.0 | 3.0 | 3.0 | 3.0 |
| RHODOLINE WA100 | 2.0 | 2.0 | 2.0 | 2.0 | 2.0 |
| ACTICIDE BW-20 | 1.0 | 1.0 | 1.0 | 1.0 | 1.0 |
| AQUAFLOW NHS300 | 7.5 | 7.5 | 7.5 | 7.5 | 7.5 |
| AQUAFLOW NLS220 | 15.0 | 15.0 | 15.0 | 15.0 | 15.0 |
| Water | 57.6 | 57.7 | 55.2 | 55.2 | 56.2 |
| Total | 1177.7 | 1177.7 | 1177.7 | 1177.7 | 1177.7 |
| Weight Solids, % | 55.3 | 55.3 | 55.3 | 55.3 | 55.3 |
| PVC, % | 50.0 | 50.0 | 50.0 | 50.0 | 50.0 |

TABLE 6A

Paint Formulation of Vinyl Acrylic Latex Flat Paint

| Raw materials | Ingredients Summary |
|---|---|
| Pigment Grind | |
| Water | |
| NATROSOL PLUS 330 | Hydroxyethylcellulose rheology modifier (associative thickener) from Ashland |
| Ammonia (28%) | |
| AMP 95 | Comparative compound from Dow-Angus |
| NBDA | Comparative compound VANTEX T from Taminco |
| AEPD | Comparative compound VOX-1000 from Dow-Angus |
| DMAPA-2PO | Compound of the invention |
| RHODOLINE 226/35 | Polyacid dispersant from Solvay Novecare |
| RHODOLINE 4160 | Anionic wetting agent from Solvay Novecare |
| RHODOLINE 688 | Defoamer from Solvay Novecare |
| TIONA 595 | Titanium dioxide pigment from Cristal Global |
| OMYACARB 3 | Calcium carbonate from Oyma North America |
| MINEX 4 | Nepheline syenite pigment filler from Unimin Specialty Minerals, Inc. |
| ATTAGEL 50 | Attapulgite clay rheology modifier from BASF |
| Letdown | |
| Water | |
| ENCOR 320 | Vinyl acrylic latex from Arkema Coating Resins |
| RHODOLINE 688 | Defoamer from Solvay Novecare |
| RHODOLINE WA100 | Wetting agent (blend of nonionic surfactants) from Solvay Novecare |
| ACTICIDE BW-20 | Aqueous based benzisothiazolinone biocide from Thor Products |
| AQUAFLOW NHS-300 | Nonionic associative polymer Rheology modifier from Ashland (hydrophobically modified polyether; See Examples 4 and 32 U.S. Pat. No. 5,574,127) |
| AQUAFLOW NLS-220 | Nonionic associative polymer Rheology modifier from Ashland |
| Water | |
| Total | |

The paint properties of pH, viscosity, gloss, opacity, film yellowing, scrub resistance, block resistance, and adhesion, are tested by following the test procedure previously described. Testing results are given in TABLE 7. Less amount of DMAPA-2PO and DMAPA-2EO of the present invention is required to reach similar pH level of the paint than the comparative samples of NBDA and AEPD due to the stronger neutralizing power of the inventive compounds. The general performance of DMAPA-2PO is very comparable to other amines tested in this formulation.

TABLE 7

Performance-Zero VOC Vinyl-Acrylic Flat Paint

| | Amines | | | | |
|---|---|---|---|---|---|
| | NH3 (28%) | AMP 95 | NBDA | AEPD | DMAPA-2PO |
| Amine Level (lbs/100 gals) | 1.6 | 1.5 | 4 | 4 | 3 |
| pH (equilibrated) | 8.7 | 8.8 | 8.9 | 9.1 | 8.8 |
| Viscosity (KU) | 101 | 101 | 95 | 96 | 98 |
| Viscosity (ICI) | 1.7 | 1.7 | 1.8 | 1.5 | 1.5 |
| Gloss (60/85 degrees) - 3 mils DD | 3.6/5.1 | 3.1/4.6 | 3.6/5.1 | 4.0/5.3 | 3.9/5.3 |
| Contrast Ratio - 3 mil DD | 96.42 | 96.38 | 96.22 | 96.57 | 97.38 |
| Yellowness index | 2.18 | 2.42 | 2.45 | 1.87 | 2.62 |
| B Value | 1.39 | 1.52 | 1.54 | 1.23 | 1.65 |
| Scrub Resistance | 2280 | 2590 | 2600 | 2680 | 2360 |
| Block Resistance | | | | | |
| 1 Day RT/Oven | 7/5 | 7/5 | 7/5 | 7/5 | 7/5 |
| 7 Day RT/Oven | 9/5 | 9/5 | 8/5 | 8/5 | 8/5 |
| Adhesion (7 day, wet/dry) | 5/5 | 5/5 | 5/5 | 5/5 | 5/5 |

Example 7

Evaluation as Neutralizing and Co-Dispersing Agent in Zero VOC VAE Latex Flat Paint The compound DMAPA-2PO is tested as neutralizing and co-dispersing agent in a zero VOC vinyl acetate ethylene (VAE) latex flat paint. Paint samples were also prepared for comparative examples with the neutralizers, namely AMP-95 from Angus-Dow (ANGUS Chemical Company, a wholly-owned subsidiary of the Dow Chemical Company), AEPD (VOX-1000 from Dow), NBDA (VANTEX-T from Taminco). TABLE 8 lists Paint Formulation of VAE Latex Flat Paint for this example. TABLE 8A provides additional information for the raw materials of this example.

TABLE 8

Paint Formulation of VAE Latex Flat Paint

| Raw materials | NH3 (28%) | AMP 95 | NBDA | AEPD | DMAPA-2PO |
|---|---|---|---|---|---|
| Pigment Grind | | | | | |
| Water | 275.60 | 275.60 | 275.60 | 275.60 | 275.60 |
| NATROSOL PLUS 330 | 2.50 | 2.50 | 2.50 | 2.50 | 2.50 |
| Ammonia (28%) | 2.20 | | | | |
| AMP 95 | | 2.20 | | | |
| NBDA | | | 6.00 | | |
| AEPD | | | | 6.00 | |
| DMAPA-2PO | | | | | 5.00 |
| ACTICIDE BW 20 | 1.10 | 1.10 | 1.10 | 1.10 | 1.10 |
| RHODOLINE 286N | 7.00 | 7.00 | 7.00 | 7.00 | 7.00 |
| CARBOWET DC01 | 2.00 | 2.00 | 2.00 | 2.00 | 2.00 |
| RHODOLINE 688 | 2.00 | 2.00 | 2.00 | 2.00 | 2.00 |
| TIONA 595 | 235.00 | 235.00 | 235.00 | 235.00 | 235.00 |
| #10 WHITE | 35.00 | 35.00 | 35.00 | 35.00 | 35.00 |
| MINEX 4 | 35.00 | 35.00 | 35.00 | 35.00 | 35.00 |
| OPTIWHITE MX | 150.00 | 150.00 | 150.00 | 150.00 | 150.00 |
| Letdown | | | | | |
| EcoVAE ® 401 | 350.00 | 350.00 | 350.00 | 350.00 | 350.00 |
| RHODOLINE 688 | 3.00 | 3.00 | 3.00 | 3.00 | 3.00 |
| POLYPROBE TR-116 | 9.50 | 9.50 | 9.50 | 9.50 | 9.50 |
| Water | 49.10 | 49.10 | 45.30 | 45.30 | 46.30 |
| Total | 1159.00 | 1159.00 | 1159.00 | 1159.00 | 1159.00 |
| Weight Solids, % | 57.6 | 57.6 | 57.6 | 57.6 | 57.6 |
| PVC, % | 47.5 | 47.5 | 47.5 | 47.5 | 47.5 |

TABLE 8A

Paint Formulation of VAE Latex Flat Paint

| Raw materials | Ingredients Summary |
|---|---|
| Pigment Grind | |
| Water | |
| NATROSOL PLUS 330 | Rheology modifier from Ashland |
| Ammonia (28%) | |
| AMP 95 | Comparative compound from Angus |
| NBDA | Comparative compound Vantex T from Taminco |
| AEPD | Comparative compound VOX-1000 from Dow |
| DMAPA-2PO | Compound of the invention |
| ACTICIDE BW 20 | Aqueous based benzisothiazolinone biocide from Thor Products |
| RHODOLINE 286N | Hydrophilic copolymer dispersant from Solvay Novecare (ammonium polyacrylate copolymer solution) |
| CARBOWET DC01 | Blend of nonionic surfactants from Air Products |
| RHODOLINE 688 | Defoamer from Solvay Novecare |
| TIONA 595 | Titanium dioxide from Cristal Global |
| #10 WHITE | dry ground calcium carbonate (marble) pigment filler from Imerys Performance Minerals |
| MINEX 4 | Nepheline syenite pigment filler from Unimin Specialty Minerals, Inc. |
| OPTIWHITE MX | Calcined aluminum silicate pigment filler from Burgess Pigments |
| Letdown | |
| EcoVAE ® 401 | Vinyl acetate/ethylene emulsion (VAE) latex polymer (emulsion polymer) from Celanese |
| RHODOLINE 688 | Defoamer from Solvay Novecare |
| POLYPROBE TR-116 | Hydrophobically modified alkali-soluble emulsion (HASE) rheology modifier from Arkema Coating Resins |
| Water | |
| Total | |

The paint properties of pH, viscosity, gloss, opacity, film yellowing, scrub resistance, block resistance, and adhesion, are tested by following the test procedure previously described. Testing results are given in TABLE 7. Less amount of DMAPA-2PO and DMAPA-2EO of the present invention is required to reach similar pH level of the paint than the comparative samples of NBDA and AEPD due to the stronger neutralizing power of the inventive compounds. The performance of DMAPA-2PO is very comparable to other amines tested in this formulation.

TABLE 9

Performance-Zero VOC VAE Flat Paint

| | Amines | | | | |
|---|---|---|---|---|---|
| | NH3 (28%) | AMP 95 | NBDA | AEPD | DMAPA-2PO |
| Amine Level (lbs/100 gals) | 2.2 | 2.2 | 6 | 6 | 5 |
| pH (equilibrated) | 8.7 | 8.6 | 8.7 | 8.9 | 8.7 |
| Viscosity (KU) | 111 | 112 | 108 | 110.0 | 110 |
| Viscosity (ICI) | 1.8 | 1.7 | 1.9 | 1.9 | 1.8 |
| Gloss (60/85 degrees) - 3 mils DD | 2.6/3.3 | 2.6/3.2 | 2.8/3.3 | 2.8/3.3 | 2.8/3.5 |
| Contrast Ration - 3 mils DD | 97.50 | 97.65 | 97.85 | 97.21 | 97.60 |
| Yellowness index | 2.82 | 2.76 | 2.91 | 2.72 | 3.12 |
| B Value | 1.73 | 1.70 | 1.79 | 1.67 | 1.90 |
| Scrub Resistance | >2500 | >2500 | >2500 | >2500 | >2500 |

TABLE 9-continued

Performance-Zero VOC VAE Flat Paint

| | Amines | | | | |
|---|---|---|---|---|---|
| | NH3 (28%) | AMP 95 | NBDA | AEPD | DMAPA-2PO |
| Block Resistance | | | | | |
| 1 Day RT/Oven | 9/6 | 9/6 | 9/6 | 9/6 | 9/6 |
| 7 Day RT/Oven | 10/7 | 10/6 | 10/6 | 10/6 | 10/6 |
| Adhesion (7 day, wet/dry) | 5/5 | 5/5 | 5/5 | 5/5 | 5/5 |

The above examples show benefits of the present invention compared to comparative samples include the following:

Zero VOC
Stronger amine neutralizer
More efficient neutralizer
Better dispersing properties
Comparable low and high shear viscosities
Comparable gloss and hiding
Comparable yellowness
Comparable block and scrub resistance.

In the above detailed description, preferred embodiments are described in detail to enable practice of the invention. Although the invention is described with reference to these specific preferred embodiments, it will be understood that the invention is not limited to these preferred embodiments. But to the contrary, the invention includes numerous alternatives, modifications and equivalents as will become apparent from consideration of the following detailed description. It is understood that upon reading the above description of the present invention, one skilled in the art could make changes and variations therefrom. These changes and variations are included in the spirit and scope of the following appended claims.

That which is claimed:

1. An aqueous dispersion comprising:
(a) 20 to 95% by weight of at least one resin binder selected from at least one member of the group consisting of a polymer latex, a polyurethane dispersion, and an alkyd emulsion, wherein 30 to 80% by weight of the resin binder is resin solids, and wherein 70 to 20% by weight is water;
(b) up to 60% by weight of a pigment;
optionally, if the binder comprises the polyurethane dispersion, the binder further comprises cross-linker selected from at least one of melamine or aziridine;
(c) 0.01 to 5% by weight of at least one [(dimethylamino)alkyl]-imino-dialcohol neutralizing agent having the formula I:

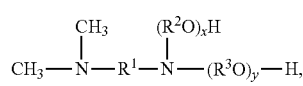

I wherein
R$^1$ is independently C2-C6 alkyl;
R$^2$ is —(C$_m$H$_{2m}$), wherein each m is independently selected from an integer from 2 to 4, x is 1 to 10;
R$^3$ is —(C$_n$H$_{2n}$), wherein each n is independently selected from an integer from is 2 to 4, y is 1 to 10;
wherein all weight percents are based on the total weight of the aqueous coating formulation,
wherein the formulation has a pH of 7 to 11,
wherein the pigment is selected from the group consisting of: titanium dioxide and other titanium pigments, white lead, zinc, oxide, zinc sulfide, barium sulfate, calcium carbonate, lithopone, silica, talc, mica, clays, iron oxide, carbon black, cadmium sulfide, toluidine red, chrome orange, chrome yellow, and chrome green.

2. An aqueous dispersion comprising:
(a) 20 to 95% by weight of at least one resin binder selected from at least one member of the group consisting of a polymer latex, a polyurethane dispersion, and an alkyd emulsion, wherein 30 to 80% by weight of the resin binder is resin solids, and wherein 70 to 20% by weight is water;
optionally, if the binder comprises the polyurethane dispersion, the binder further comprises cross-linker selected from at least one of melamine or aziridine;
(b) 0.01 to 5% by weight of at least one [(dimethylamino)alkyl]-imino-dialcohol neutralizing agent having the formula I:

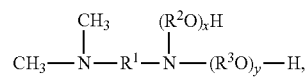

I wherein
R$^1$ is independently C2-C6 alkyl;
R$^2$ is —(C$_m$H$_{2m}$), wherein each m is independently selected from an integer from 2 to 4, x is 1 to 10;
R$^3$ is —(C$_n$H$_{2n}$), wherein each n is independently selected from an integer from is 2 to 4, y is 1 to 10;
wherein all weight percents are based on the total weight of the aqueous coating formulation,
wherein the formulation has a pH of 7 to 11, and wherein the formulation has an absence of pigment.

3. An aqueous dispersion comprising:
(a) 20 to 95% by weight of at least one resin binder selected from at least one member of the group consisting of a polymer latex, a polyurethane dispersion, and an alkyd emulsion, wherein 30 to 80% by weight of the resin binder is resin solids, and wherein 70 to 20% by weight is water;
(b) up to 60% by weight of a pigment;
optionally, if the binder comprises the polyurethane dispersion, the binder further comprises cross-linker selected from at least one of melamine or aziridine;
(c) 0.01 to 5% by weight of at least one [(dimethylamino)alkyl]-imino-dialcohol neutralizing agent having the formula I:

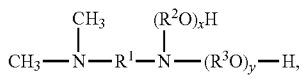

wherein
R¹ is independently C2-C6 alkyl;
R² is —($C_mH_{2m}$), wherein each m is independently selected from an integer from 2 to 4, x is 1 to 10;
R³ is —($C_nH_{2n}$), wherein each n is independently selected from an integer from is 2 to 4, y is 1 to 10;
wherein all weight percents are based on the total weight of the aqueous coating formulation,
wherein the formulation has a pH of 7 to 11,
wherein the at least one resin binder is a polymer latex selected from at least one member of the group consisting of pure acrylics, styrene acrylics, vinyl acrylics and acrylated ethylene vinyl acetate copolymers.

4. An aqueous dispersion comprising:
(a) 20 to 95% by weight of at least one resin binder selected from at least one member of the group consisting of a polymer latex, a polyurethane dispersion, and an alkyd emulsion, wherein 30 to 80% by weight of the resin binder is resin solids, and wherein 70 to 20% by weight is water;
(b) up to 60% by weight of a pigment;
optionally, if the binder comprises the polyurethane dispersion, the binder further comprises cross-linker selected from at least one of melamine or aziridine;
(c) 0.01 to 5% by weight of at least one [(dimethylamino)alkyl]-imino-dialcohol neutralizing agent having the formula I:

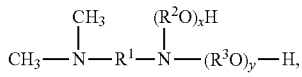

wherein
R¹ is independently C2-C6 alkyl;
R² is —($C_mH_{2m}$), wherein each m is independently selected from an integer from 2 to 4, x is 1 to 10;
R³ is —($C_nH_{2n}$), wherein each n is independently selected from an integer from is 2 to 4, y is 1 to 10;
wherein all weight percents are based on the total weight of the aqueous coating formulation,
wherein the formulation has a pH of 7 to 11, wherein said at least one resin binder comprises at least one polyurethane in an aqueous dispersion and optionally, the binder comprises cross-linker, preferably selected from at least one of melamine or aziridine.

5. An aqueous dispersion comprising:
(a) 20 to 95% by weight of at least one resin binder selected from at least one member of the group consisting of a polymer latex, a polyurethane dispersion, and an alkyd emulsion, wherein 30 to 80% by weight of the resin binder is resin solids, and wherein 70 to 20% by weight is water;
(b) up to 60% by weight of a pigment;
optionally, if the binder comprises the polyurethane dispersion, the binder further comprises cross-linker selected from at least one of melamine or aziridine;
(c) 0.01 to 5% by weight of at least one [(dimethylamino)alkyl]-imino-dialcohol neutralizing agent having the formula I:

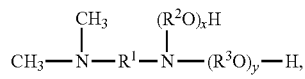

wherein
R¹ is independently C2-C6 alkyl;
R² is —($C_mH_{2m}$), wherein each m is independently selected from an integer from 2 to 4, x is 1 to 10;
R³ is —($C_nH_{2n}$), wherein each n is independently selected from an integer from is 2 to 4, y is 1 to 10;
wherein all weight percents are based on the total weight of the aqueous coating formulation,
wherein the formulation has a pH of 7 to 11, wherein said at least one resin binder comprises at least one alkyd emulsion.

6. The aqueous formulation of claim 1 comprising the [(dimethylamino)alkyl]-imino-dialcohol compound, wherein
R¹ is independently C2-C3 alkyl;
R² is —($C_mH_{2m}$), wherein each m is independently selected from an integer from 2 to 3, x is 1 to 5;
R³ is —($C_nH_{2n}$), wherein each n is independently selected from an integer from 2 to 3, y is 1 to 5;
wherein all weight percents are based on the total weight of the aqueous coating formulation.

7. The aqueous formulation of claim 1 wherein at least one [(dimethylamino)alkyl]-imino-dialcohol compound comprises a compound having the formula II:

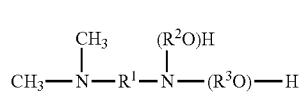

R² is —($C_mH_{2m}$), wherein m is 2 to 3.

8. The aqueous formulation of claim 1 wherein at least one [(dimethylamino)alkyl]-imino-dialcohol compound comprises a compound having the formula III:

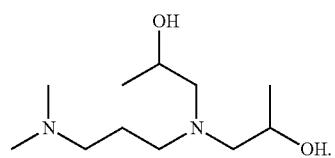

9. The aqueous formulation of claim 1 wherein at least one [(dimethylamino)alkyl]-imino-dialcohol compound comprises a compound having the formula IV:

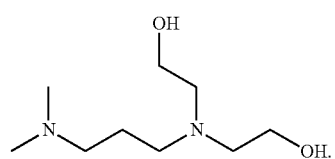

* * * * *